(12) United States Patent
Maekawa et al.

(10) Patent No.: US 10,587,175 B2
(45) Date of Patent: Mar. 10, 2020

(54) DOUBLE-STATOR ROTATING ELECTRIC MACHINE

(71) Applicant: DENSO CORPORATION, Kariya, Aichi-pref. (JP)

(72) Inventors: Takeo Maekawa, Okazaki (JP); Shin Kusase, Obu (JP); Keiji Kondou, Nagoya (JP)

(73) Assignee: DENSO CORPORATION, Kariya (JP)

( * ) Notice: Subject to any disclaimer, the term of this patent is extended or adjusted under 35 U.S.C. 154(b) by 1244 days.

(21) Appl. No.: 14/820,994

(22) Filed: Aug. 7, 2015

(65) Prior Publication Data

US 2016/0043619 A1 Feb. 11, 2016

(30) Foreign Application Priority Data

Aug. 7, 2014 (JP) .................................. 2014-161310

(51) Int. Cl.
*H02K 16/04* (2006.01)
*H02K 16/00* (2006.01)
(Continued)

(52) U.S. Cl.
CPC ............. *H02K 16/04* (2013.01); *H02K 16/00* (2013.01); *H02K 1/272* (2013.01); *H02K 1/274* (2013.01); *H02K 1/2706* (2013.01); *H02K 1/2753* (2013.01); *H02K 1/30* (2013.01); *H02K 17/42* (2013.01); *H02K 21/12* (2013.01); *H02K 23/36* (2013.01); *H02K 49/043* (2013.01); *H02K 49/046* (2013.01); *H02K 49/102* (2013.01); *H02K 49/106* (2013.01); *H02K 49/108* (2013.01)

(58) Field of Classification Search
CPC ...... H02K 1/2706; H02K 1/272; H02K 1/274; H02K 1/2753; H02K 1/278; H02K 1/30; H02K 16/00; H02K 17/42; H02K 21/12; H02K 23/56; H02K 23/36; H02K 49/102; H02K 49/106; H02K 49/108
USPC ....... 310/126, 140, 141, 142, 143, 144, 145, 310/146, 168, 261.1, 266
See application file for complete search history.

(56) References Cited

U.S. PATENT DOCUMENTS 4,532,447 A * 7/1985 Cibie ..................... H02K 51/00
310/114
5,081,388 A * 1/1992 Chen ..................... H02K 21/12
310/156.01
(Continued)

FOREIGN PATENT DOCUMENTS

JP S52-146805 A 12/1977
JP S60-079241 A 5/1985
(Continued)

*Primary Examiner* — Jermele M Hollington
*Assistant Examiner* — Rashad H Johnson
(74) *Attorney, Agent, or Firm* — Oliff PLC

(57) ABSTRACT

A double-stator rotating electric machine includes a rotor, an outer stator disposed radially outside the rotor with an outer gap formed therebetween, and an inner stator disposed radially inside the rotor with an inner gap formed therebetween. The outer stator has an outer multi-phase coil wound thereon, and the inner stator has an inner multi-phase coil wound thereon. Moreover, the inner gap formed between the inner stator and the rotor is set to be larger than the outer gap formed between the outer stator and the rotor.

22 Claims, 13 Drawing Sheets

(51) Int. Cl.
*H02K 49/10* (2006.01)
*H02K 1/27* (2006.01)
*H02K 17/42* (2006.01)
*H02K 21/12* (2006.01)
*H02K 49/04* (2006.01)
*H02K 23/36* (2006.01)
*H02K 1/30* (2006.01)

(56) References Cited

U.S. PATENT DOCUMENTS

| | | | |
|---|---|---|---|
| 5,936,326 A | 8/1999 | Umeda et al. |
| 5,952,749 A | 9/1999 | Umeda et al. |
| 5,955,810 A | 9/1999 | Umeda et al. |
| 5,965,965 A | 10/1999 | Umeda et al. |
| 5,982,068 A | 11/1999 | Umeda et al. |
| 5,986,375 A | 11/1999 | Umeda et al. |
| 5,994,813 A | 11/1999 | Umeda et al. |
| 5,998,903 A | 12/1999 | Umeda et al. |
| 6,011,332 A | 1/2000 | Umeda et al. |
| 6,020,669 A | 2/2000 | Umeda et al. |
| 6,051,906 A | 4/2000 | Umeda et al. |
| 6,091,169 A | 7/2000 | Umeda et al. |
| 6,097,130 A | 8/2000 | Umeda et al. |
| 6,124,660 A | 9/2000 | Umeda et al. |
| 6,137,201 A | 10/2000 | Umeda et al. |
| 6,144,136 A | 11/2000 | Umeda et al. |
| 6,181,043 B1 | 1/2001 | Kusase et al. |
| 6,181,045 B1 | 1/2001 | Umeda et al. |
| 6,198,190 B1 | 3/2001 | Umeda et al. |
| 6,291,918 B1 | 9/2001 | Umeda et al. |
| 6,459,177 B1 | 10/2002 | Nakamura et al. |
| 6,459,186 B1 | 10/2002 | Umeda et al. |
| 9,479,036 B2 * | 10/2016 | Lim ................ H02K 16/00 |
| 2011/0316366 A1 * | 12/2011 | Abbasian ......... H02K 16/04 310/46 |
| 2012/0080977 A1 * | 4/2012 | Kusase ............ H02K 7/14 310/216.001 |
| 2012/0086292 A1 * | 4/2012 | Ishida ............ H02K 11/25 310/71 |
| 2012/0187794 A1 * | 7/2012 | Inoue ............ H02K 1/2773 310/181 |
| 2012/0200184 A1 * | 8/2012 | Takeuchi ........ H02K 16/00 310/112 |
| 2013/0099618 A1 * | 4/2013 | Kusase ............ H02K 3/28 310/156.56 |
| 2013/0207498 A1 * | 8/2013 | Kusase ............ H02K 1/16 310/156.01 |
| 2013/0264895 A1 | 10/2013 | Kondou et al. |
| 2014/0232233 A1 | 8/2014 | Fukushima et al. |
| 2015/0137655 A1 * | 5/2015 | Maekawa ........ H02K 1/30 310/216.129 |
| 2015/0295477 A1 | 10/2015 | Koizumi et al. |
| 2016/0043619 A1 * | 2/2016 | Maekawa ........ H02K 16/04 310/156.08 |

FOREIGN PATENT DOCUMENTS

| | | |
|---|---|---|
| JP | S60-079241 U | 6/1985 |
| JP | 2001-016826 A | 1/2001 |
| JP | 2007-282331 A | 10/2007 |
| JP | 2010-166717 A | 7/2010 |
| JP | 2013-027244 A | 2/2013 |
| JP | 2013-176247 A | 9/2013 |
| JP | 2014-161180 A | 9/2014 |

* cited by examiner

DOUBLE-STATOR ROTATING ELECTRIC MACHINE

CROSS-REFERENCE TO RELATED APPLICATION

This application is based on and claims priority from Japanese Patent Application No. 2014-161310 filed on Aug. 7, 2014, the content of which is hereby incorporated by reference in its entirety into this application.

BACKGROUND

1 Technical Field

The present invention relates to double-stator rotating electric machines which include a rotor, an outer stator disposed radially outside the rotor, and an inner stator disposed radially inside the rotor.

2 Description of Related Art

Japanese Patent Application Publication No. JP2007282331A discloses a double-stator electric motor. The motor includes a rotor, an outer stator disposed radially outside the rotor, and an inner stator disposed radially inside the rotor. The rotor includes an annular rotor core, a plurality of outer permanent magnets and a plurality of inner permanent magnets. The rotor core has a plurality of fitting holes and a plurality of protrusions. The fitting holes are formed in close vicinity to a radially outer surface of the rotor core and spaced from one another in a circumferential direction of the rotor core. The protrusions are formed on a radially inner surface of the rotor core and spaced from one another in the circumferential direction. Each of the outer permanent magnets is fitted in one of the fitting holes of the rotor core. Each of the inner permanent magnets is mounted on the radially inner surface of the rotor core so as to be circumferentially interposed between an adjacent pair of the protrusions of the rotor core.

Consequently, with the outer permanent magnets fitted in the corresponding fitting holes of the rotor core, it is possible to reliably prevent the outer permanent magnets from being detached from the rotor core during high-speed rotation of the rotor. Moreover, with the protrusions of the rotor core, it is possible to reliably prevent deviation in circumferential position of the inner permanent magnets. Furthermore, with the inner permanent magnets mounted on the radially inner surface of the rotor core, it is possible to reduce the radial gap between the inner permanent magnets and the inner stator, thereby increasing the output torque of the motor.

However, during operation of the motor, both the outer and inner stators generate heat. In particular, the inner stator is entirely surrounded by the rotor and a motor housing. Consequently, it is difficult to supply coolant to the inner stator; thus, it is difficult to dissipate the heat generated by the inner stator.

To solve the above problem, one may consider increasing the cross-sectional area of a coil of the inner stator and thereby reducing the heat generated by the coil during operation of the motor. However, in this case, the size of the entire motor would be increased accordingly. In other words, the size of the motor would become large for the output torque of the motor.

SUMMARY

According to one aspect of the present invention, there is provided a double-stator rotating electric machine which includes a rotor, an outer stator disposed radially outside the rotor with an outer gap formed therebetween, and an inner stator disposed radially inside the rotor with an inner gap formed therebetween. The outer stator has an outer multi-phase coil wound thereon, and the inner stator has an inner multi-phase coil wound thereon. Moreover, the inner gap formed between the inner stator and the rotor is set to be larger than the outer gap formed between the outer stator and the rotor.

Setting the inner gap as above, it becomes easy for coolant to flow through the inner gap, increasing the flow rate of the coolant. Moreover, due to the centrifugal force created with rotation of the rotor, the coolant flowing through the inner gap cools not only the inner stator, but also the outer multi-phase coil and the outer stator. Consequently, it becomes possible to improve the cooling performance of the entire rotating electric machine, thereby increasing the output of the rotating electric machine.

According to another aspect of the present invention, there is provided a double-stator rotating electric machine which includes a rotor, an outer stator disposed radially outside the rotor with an outer gap formed therebetween, and an inner stator disposed radially inside the rotor with an inner gap formed therebetween. The outer stator has an outer multi-phase coil wound thereon, and the inner stator has an inner multi-phase coil wound thereon. Moreover, the double-stator rotating electric machine includes a plurality of U-shaped conductors. Each of the U-shaped conductors consists of an outer coil part that constitutes a part of the outer multi-phase coil, an inner coil part that constitutes a part of the inner multi-phase coil, and a bridging part that bridges the outer coil part and the inner coil part. The inner stator has a plurality of slots formed therein. In each of the slots of the inner stator, there are received the inner coil parts of a predetermined number of the U-shaped conductors. At least one of the predetermined number of the U-shaped conductors has a twisted portion formed in the bridging part on the inner stator side. The twisted portion is twisted by an angle within a predetermined range including 90°.

With the above configuration, part of coolant flowing down along the bridging parts of the U-shaped conductors is changed in speed and direction by the twisted portions. More specifically, part of the coolant flowing down along the bridging parts is guided by the twisted portions so as to flow along the inner multi-phase coil into the slots of the inner stator. Consequently, it is possible to more effectively cool the inner multi-phase coil and the inner stator. As a result, it is possible to improve the cooling performance of the entire rotating electric machine, thereby increasing the output of the rotating electric machine.

According to yet another aspect of the present invention, there is provided a double-stator rotating electric machine which includes a rotor, an outer stator disposed radially outside the rotor with an outer gap formed therebetween, and an inner stator disposed radially inside the rotor with an inner gap formed therebetween. The outer stator has an outer multi-phase coil wound thereon, and the inner stator has an inner multi-phase coil wound thereon. Moreover, the double-stator rotating electric machine includes a plurality of U-shaped conductors. Each of the U-shaped conductors consists of an outer coil part that constitutes a part of the outer multi-phase coil, an inner coil part that constitutes a part of the inner multi-phase coil, and a bridging part that bridges the outer coil part and the inner coil part. The bridging part has a bent portion formed therein, and the bent portion is bent in a direction that is inclined in the direction of rotation of the rotor with respect to a radial direction of the rotor.

With the above configuration, during rotation of the rotor, coolant, which is spattered on the bridging parts by the centrifugal force, is guided by the bent portions to flow to the radially outer ends of the bridging parts. Consequently, without the coolant remaining on the bridging parts, it is possible to effectively cool the bridging parts As a result, the cooling performance of the entire rotating electric machine is improved, thereby increasing the output of the rotating electric machine.

According to still another aspect of the present invention, there is provided a double-stator rotating electric machine which includes a rotor, an outer stator disposed radially outside the rotor with an outer gap formed therebetween, and an inner stator disposed radially inside the rotor with an inner gap formed therebetween. The outer stator has an outer multi-phase coil wound thereon, and the inner stator has an inner multi-phase coil wound thereon. Moreover, the double-stator rotating electric machine includes a plurality of U-shaped conductors. Each of the U-shaped conductors consists of an outer coil part that constitutes a part of the outer multi-phase coil, an inner coil part that constitutes a part of the inner multi-phase coil, and a bridging part that bridges the outer coil part and the inner coil part. The double-stator rotating electric machine further includes a temperature sensing element that is arranged in a space between an adjacent pair of the bridging parts of the U-shaped conductors to sense a temperature of the U-shaped conductors.

With the above arrangement, the temperature sensing element is sandwiched between the pair of the bridging parts, thereby securing a large contact area of the temperature sensing element with the bridging parts. Consequently, it is possible for the temperature sensing element to accurately and stably sense the temperature of the U-shaped conductors. Moreover, it is also possible to prevent the temperature sensing element from protruding from the pair of the bridging parts. Furthermore, since the space between the pair of the bridging parts tapers radially inward, it is possible to securely retain the temperature sensing element, regardless of its size, in the space by radially inserting the temperature sensing element from the radially outer side to the radially inner side of the space. In addition, by controlling the flow rate of coolant based on the temperature sensed by the temperature sensing element, it is possible to improve the cooling performance of the entire rotating electric machine, thereby increasing the output of the rotating electric machine.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
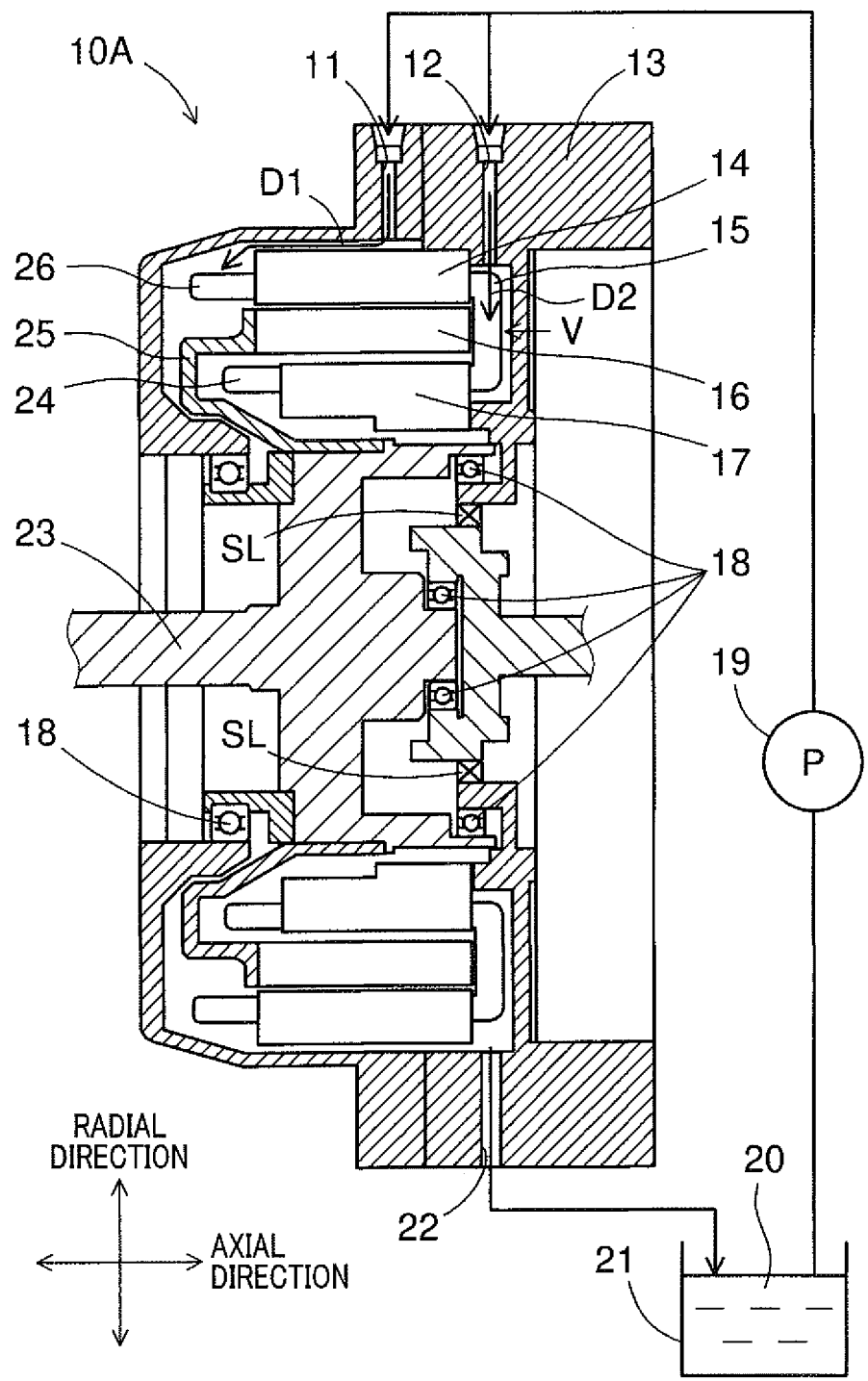
FIG. 1 is a cross-sectional view of a double-stator rotating electric machine according to a first embodiment.

Exemplary embodiments will be described hereinafter with reference to FIGS. 1-24. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a double-stator rotating electric machine 10A according to a first embodiment.

In this embodiment, the rotating electric machine 10A is configured as a motor-generator that selectively functions either as an electric motor or as an electric generator.

As shown in FIG. 1, the rotating electric machine 10A includes a housing 13, an outer stator 14, a rotor 16, an inner stator 17, bearings 18, a rotating shaft 23 and a disc 25.

The housing 13 may have any shape suitable for receiving the outer stator 14, the rotor 16, the inner stator 17, the rotating shaft 23 and the disc 25 therein.

In the housing 13, there are provided the bearings 18 via which the rotating shaft 23 is rotatably supported by the housing 13. In addition, the rotating shaft 23 may have any shape suitable for rotation.

Coolant 20, which is drawn up by a pump 19 from a coolant reservoir 21, flows down in the housing 13. The coolant 20 in the housing 13 is sealed by a seal member SL. Specifically, the coolant 20 is introduced into the housing 13 via first and second coolant introduction portions 11 and 12 formed in a top wall of the housing 13, flows down in the housing 13 while cooling the outer stator 14, the rotor 16 and the inner stator 17, and is discharged out of the housing 13 via a coolant discharge portion 22 of the housing 13.

More specifically, the coolant 20 introduced into the housing 13 via the first coolant introduction portion 11 flows down mainly along a path indicated by the arrow line D1 in FIG. 1, cooling the outer stator 14 and an outer multi-phase coil 26 wound on the outer stator 14. In addition, on either or both of an inner surface of the housing 13 and an outer surface of the outer stator 14, there may be formed radial guide portions (e.g., protrusions or recesses) so as to facilitate the dispersion of the coolant 20 flowing out of the first coolant introduction portion 11.

On the other hand, the coolant 20 introduced into the housing 13 via the second coolant introduction portion 12 flows down mainly along a path indicated by the arrow line D2 in FIG. 1, cooling bridging parts 15, the rotor 16, the inner stator 17 and an inner multi-phase coil 24 wound on the inner stator 17. Here, the bridging parts 15 are provided to bridge (or connect) the outer multi-phase coil 26 wound on the outer stator 14 and the inner multi-phase coil 24 wound on the inner stator 17.

The coolant 20 discharged out of the housing 13 via the coolant discharge portion 22 is returned to the coolant reservoir 21. Here, the coolant reservoir 21 may be implemented by any container or tank suitable for storing the coolant 20 therein. In addition, the coolant reservoir 21 may be configured to cool or heat the coolant 20.

The flow rate of the coolant 20 may be controlled based on a temperature $\theta$ sensed by a temperature sensing element 30 (see FIG. 11) which will be described in detail later. More specifically, a control device (e.g., an ECU or a computer) may be employed to control the drive of the pump 19 based on the temperature $\theta$ sensed by the temperature sensing element 30, thereby controlling the flow rate of the coolant 20.

The rotor 16 is fixed to the disc 25, and the disc 25 is further fixed to the rotating shaft 23. That is, the rotor 16 is fixed to the rotating shaft 23 via the disc 25. In addition, the rotor 16, the disc 25 and the rotating shaft 23 may be fixed together by any suitable fixing means.

The outer stator 14 and the inner stator 17 are fixed to an inner wall surface of the housing 13 so as to be radially opposed to each other with the rotor 16 interposed therebetween. That is, the outer stator 14 is disposed radially outside the rotor 16 with an outer gap Go formed therebetween; and the inner stator 17 is disposed radially inside the rotor 16 with an inner gap Gi formed therebetween. In addition, the outer and inner stators 14 and 17 may be fixed to the inner wall surface of the housing 13 by any suitable fixing means.

The outer stator 14 has the outer multi-phase coil (e.g., three-phase coil) 26 wound thereon, while the inner stator 17 has the inner multi-phase coil (e.g., three-phase coil) 24 wound thereon. More specifically, the outer multi-phase coil 26 is wound on a stator core 14c of the outer stator 14, while the inner multi-phase coil 24 is wound on a stator core 17c of the inner stator 17 (see FIG. 2).

Figure 2:
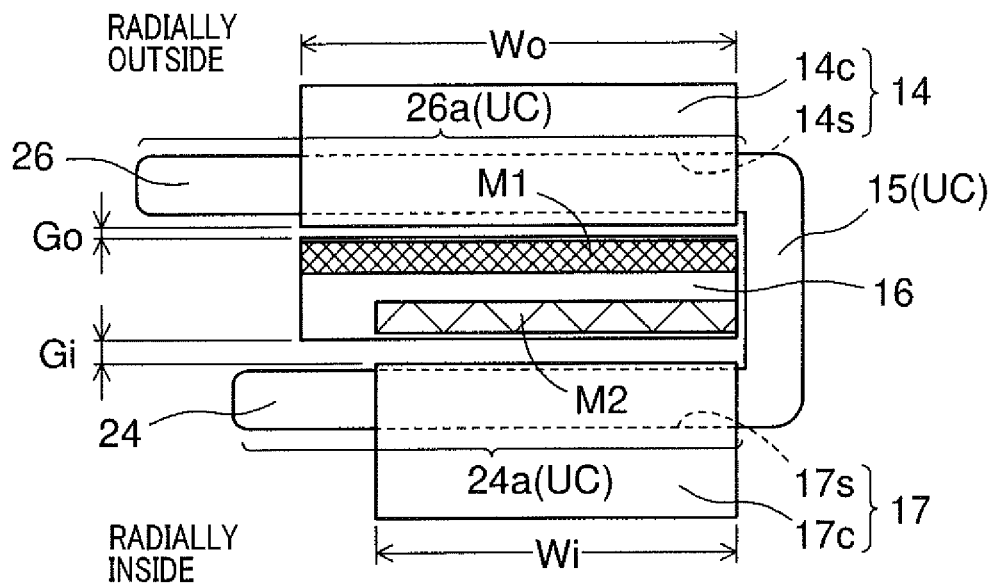
FIG. 2 is an enlarged view of an outer stator, a rotor and an inner stator of the double-stator rotating electric machine.

Moreover, as shown in FIG. 2, the outer multi-phase coil 26 wound on the outer stator 14 and the inner multi-phase coil 24 wound on the inner stator 17 are bridged (or connected) by the bridging parts 15. More specifically, in the present embodiment, the double-stator rotating electric machine 10A includes a plurality of U-shaped conductors UC. Each of the U-shaped conductors UC consists of: an outer coil part 26a that constitutes a part of the outer multi-phase coil 26; an inner coil part 24a that constitutes a part of the inner multi-phase coil 24; and one of the bridging parts 15 that bridges (or connects) the outer coil part 26a and the inner coil part 24a. That is, the outer coil part 26a, the inner coil part 24a and the bridging part 15 are integrally formed into one piece (i.e., the U-shaped conductor UC).

In addition, as will be described in detail later, in the present embodiment, the outer multi-phase coil 26, the inner multi-phase coil 24 and the bridging parts 15 are formed of a plurality of U-shaped conductors UC that are mounted on the outer and inner stators 14 and 17 and joined to one another by, for example, welding (see FIG. 9). Alternatively, the outer multi-phase coil 26, the inner multi-phase coil 24 and the bridging parts 15 may be formed of at least one continuous conductor wire which includes a plurality of U-shaped portions each corresponding to one U-shaped conductor UC.

Next, a cooling structure of the double-stator rotating electric machine 10A according to the present embodiment will be described.

As shown in FIG. 2, between the outer stator 14 and the rotor 16, there is provided the outer gap Go; between the rotor 16 and the inner stator 17, there is provided the inner gap Gi. In the present embodiment, the inner gap Gi is set to be larger than the outer gap Go (i.e., Gi>Go).

For each of the outer and inner gaps Go and Gi, with decrease in the gap, it becomes easier for magnetic flux to flow across the gap, thereby increasing the torque of the rotating electric machine 10A. In contrast, with increase in the gap, it becomes easier for the coolant 20 to flow through the gap, thereby improving the cooling performance of the rotating electric machine 10A.

Figure 3:
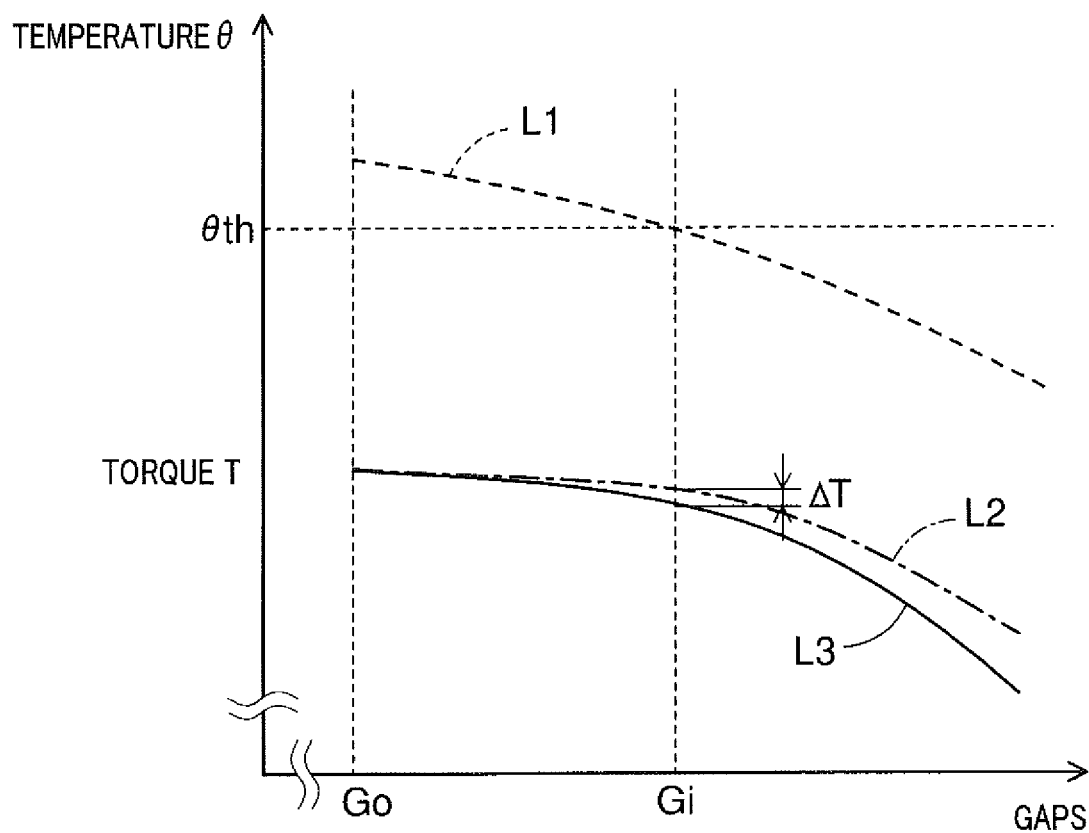
FIG. 3 is a graphical representation illustrating the relationship between an inner gap, an outer gap, a coil temperature and torque.

FIG. 3 illustrates the relationship between the coil temperature $\theta$ (more particularly, the temperature $\theta$ of the inner multi-phase coil 24), the torque T (more particularly, the torque T generated in the inner stator 17) and the outer and inner gaps Go and Gi.

As seen from FIG. 3, with increase in the inner gap Gi, the coil temperature $\theta$ decreases as indicated by a characteristic line L1 (dashed line), and the torque T generated in the inner stator 17 also decreases as indicated by a characteristic line L2 (chain line) and a characteristic line L3 (continuous line). Here, the characteristic line L3 indicates that the torque T decreases with increase in the inner gap Gi; and the characteristic line L2 indicates that the decrease in the torque T is suppressed as the flow rate of the coolant 20 increases with the inner gap Gi.

In the present embodiment, the outer gap Go is first set, in consideration of the accuracies of machining and mounting the outer stator 14, the rotor 16 and the inner stator 17, so as to keep the coil temperature $\theta$ lower than or equal to a threshold temperature $\theta$th. Here, the threshold temperature θth denotes an allowable upper limit of the coil temperature θ. Then, the inner gap Gi is set, based on the characteristic line L1, so as to keep the coil temperature θ lower than or equal to the threshold temperature θth.

In addition, the difference ΔT between the characteristic lines L2 and L3 represents the increase in the torque T caused by the increase in the flow rate of the coolant 20. Therefore, though the inner gap Gi is set to be larger than the outer gap Go, it is possible to suppress the decrease in the torque T.

Moreover, as shown in FIG. 2, the stator core 14c of the outer stator 14 has an axial thickness Wo, while the stator core 17c of the inner stator 17 has an axial thickness Wi. In the present embodiment, the axial thickness Wi of the stator core 17c of the inner stator 17 is set to be smaller than the axial thickness Wo of the stator core 14c of the outer stator 14 (i.e., Wi<Wo). Consequently, with the smaller axial thickness Wi, the volume of the inner stator 17 is reduced. As a result, it is possible to more effectively cool the inner stator 17 with the same amount of the coolant 20.

Figure 4:
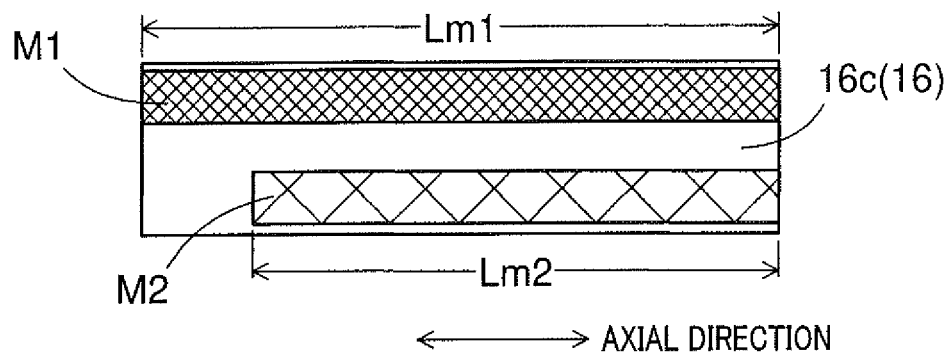
FIG. 4 is a schematic view illustrating the configuration of outer and inner permanent magnets of the rotor.

Referring to FIG. 4, the rotor 16 includes an annular (or hollow cylindrical) rotor core 16c, a plurality of outer permanent magnets M1 and a plurality of inner permanent magnets M2. The outer permanent magnets M1 are provided on the radially outer side (i.e., the upper side in FIG. 4) of the rotor core 16c, while the inner permanent magnets M2 are provided on the radially inner side (i.e., the lower side in FIG. 4) of the rotor core 16c. Moreover, the outer permanent magnets M1 have an axial length Lm1, while the inner permanent magnets M2 have an axial length Lm2. In the present embodiment, the axial length Lm2 of the inner permanent magnets M2 is set to be smaller than the axial length Lm1 of the outer permanent magnets M1 (i.e., Lm2<Lm1). Consequently, with the smaller axial length Lm2, the magnetic path in the rotor core 16c available for magnetic flux created by the outer permanent magnets M1 and the outer stator 14 is widened. As a result, it becomes easy to relax magnetic saturation of the rotor core 16c, thereby increasing the torque of the rotating electric machine 10A.

Figure 5:
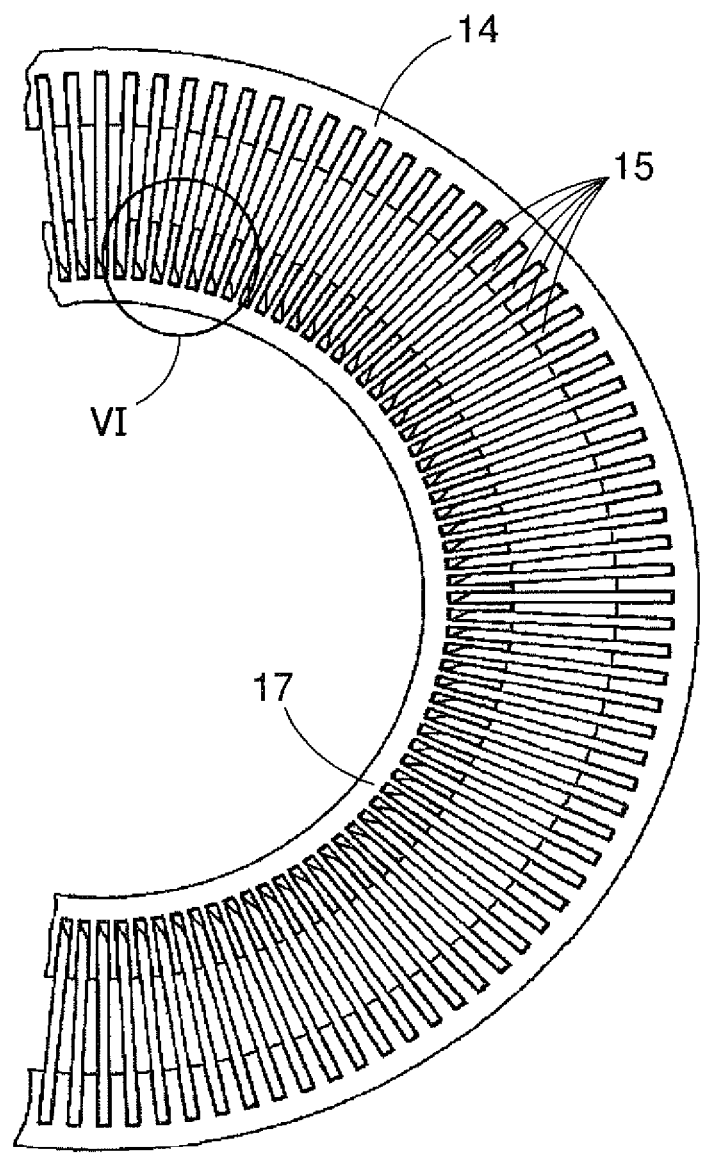
FIG. 5 is a side view, along the direction V in FIG. 1, of the outer stator, the rotor and the inner stator.
Figure 6:
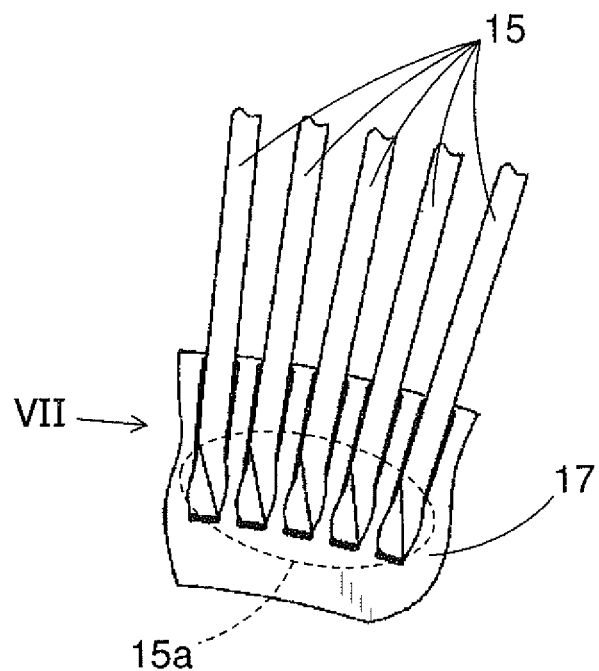
FIG. 6 is an enlarged view of the region VI circled in FIG. 5.
Figure 7:
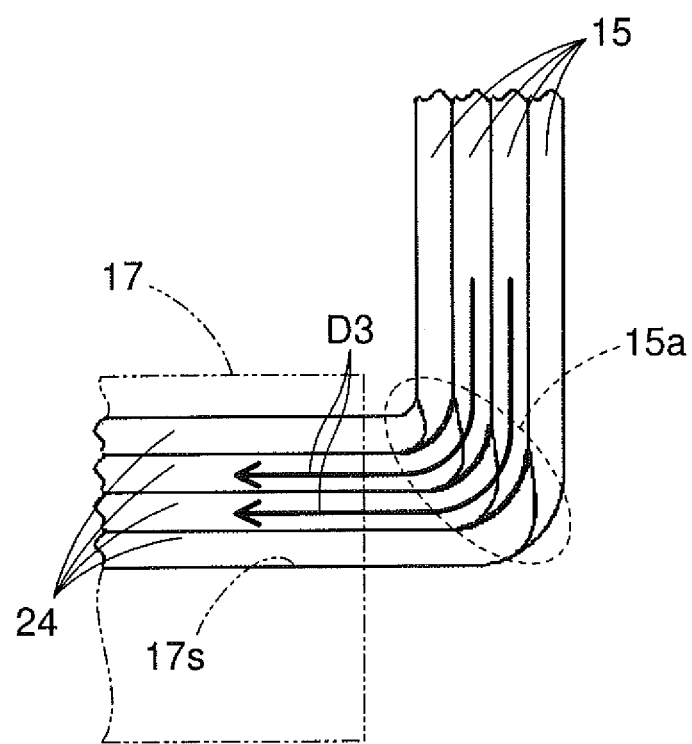
FIG. 7 is a view along the direction VII in FIG. 6.
Figure 8:
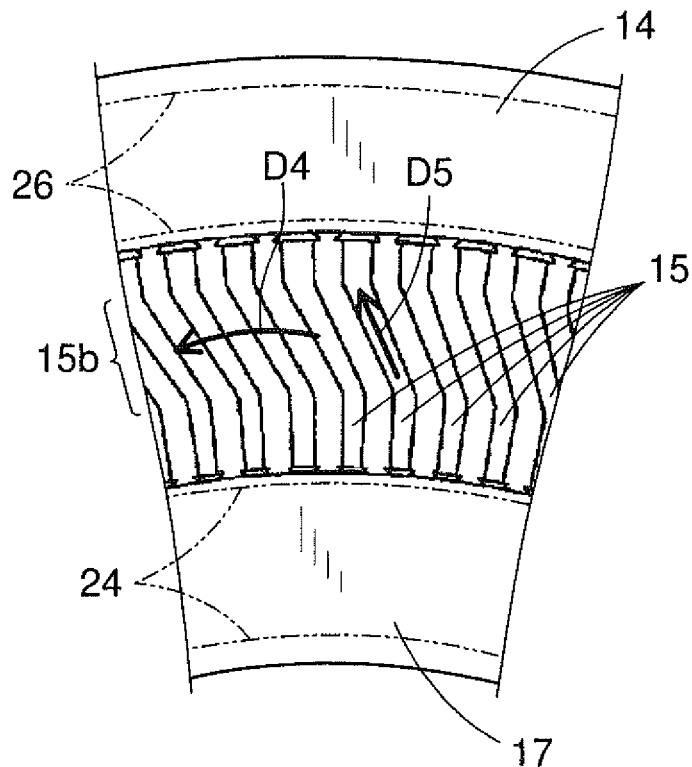
FIG. 8 is an axial view illustrating bent portions formed in bridging parts of U-shaped conductors in the double-stator rotating electric machine.

FIG. 5 is a side view, along the direction V in FIG. 1, of the outer stator 14, the rotor 16 and the inner stator 17. FIG. 6 is an enlarged view of the region VI circled in FIG. 5. FIG. 7 is a view along the direction VII in FIG. 6. FIG. 9 is a schematic view illustrating the configuration of the U-shaped conductors UC, omitting the rotor 16. FIG. 8 is a view along the direction VIII in FIG. 9.

Figure 9:
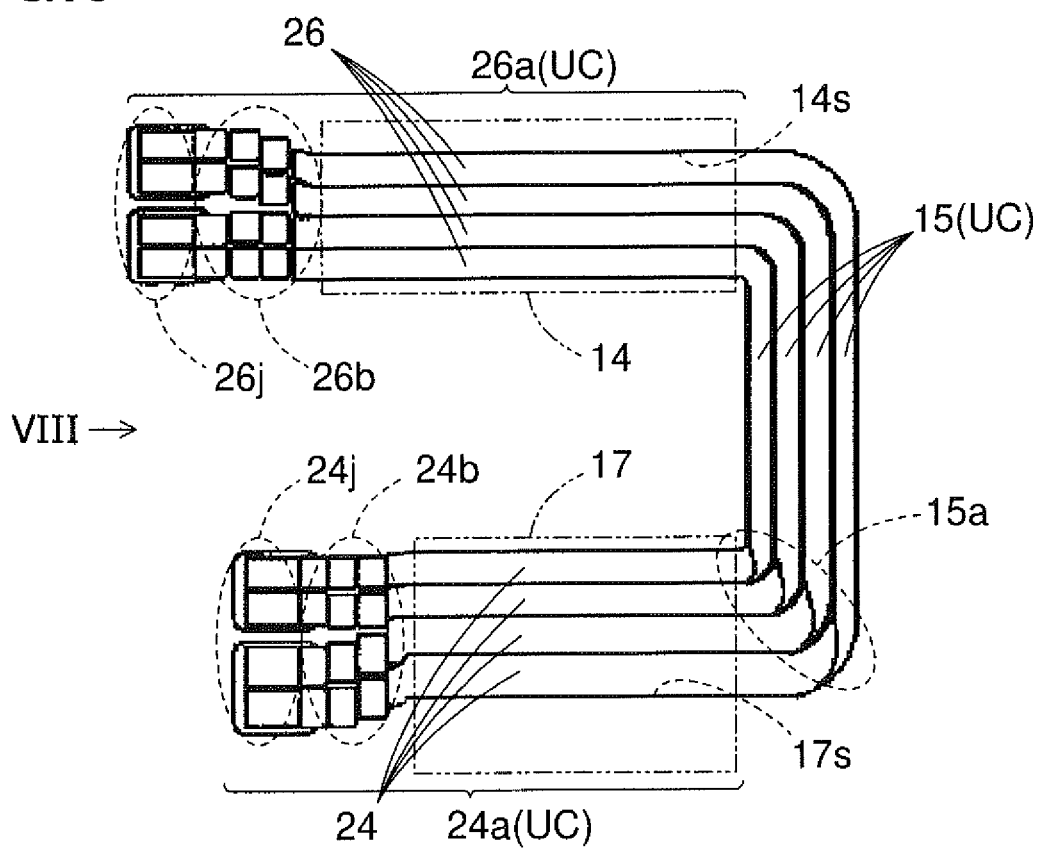
FIG. 9 is a schematic view illustrating the configuration of the U-shaped conductors.

As shown in FIGS. 6-7 and 9, each of the bridging parts 15 of the U-shaped conductors UC has a twisted portion 15a formed on the inner stator 17 side. In the present embodiment, the twisted portion 15a is twisted by 90° (within the range of manufacturing tolerances).

In operation, part of the coolant 20 flowing down along the bridging parts 15 of the U-shaped conductors UC is changed in speed and direction by the twisted portions 15a of the bridging parts 15. More specifically, as indicated by the arrow lines D3 in FIG. 7, part of the coolant 20 flowing down along the bridging parts 15 is guided by the twisted portions 15a of the bridging parts 15 so as to flow along the inner multi-phase coil 24 into slots 17s formed in the stator core 17c of the inner stator 17. Consequently, it is possible to more effectively cool the inner multi-phase coil 24 and the inner stator 17.

In addition, the twisted portions 15a of the bridging parts 15 may also be twisted by any angle, other than 90°, within a predetermined range (e.g., the range of 45 to 135°) such that the speed and direction of the coolant 20 can be changed by the twisted portions 15a.

Moreover, as shown in FIG. 8, each of the bridging parts 15 of the U-shaped conductors UC has a bent portion 15b. The bent portion 15b is formed by bending part or the whole of the bridging part 15 in a direction that is inclined in the direction of rotation of the rotor 16 (i.e., the direction D4 in FIG. 8) with respect to a radial direction of the rotor 16. More particularly, in the present embodiment, the bent portion 15b is formed by bending part of the bridging part 15 in a direction indicated by D5 in FIG. 8. In addition, the bent portion 15b may be formed into a straight-line shape, a polygonal-line shape or a curved-line shape.

In operation, with rotation of the rotor 16, the coolant 20 adhered to the rotor 16 is spattered by the centrifugal force. Since the bent portions 15b of the bridging parts 15 are bent in the direction D5 that is inclined in the direction D4 of rotation of the rotor 16 with respect to the radial direction of the rotor 16, the coolant 20 spattered on the bridging parts 15 is guided by the bent portions 15b to flow to the radially outer ends of the bridging parts 15. Consequently, without the coolant 20 remaining on the bridging parts 15, it is possible to effectively cool the bridging parts 15. As a result, the cooling performance of the entire rotating electric machine 10A is improved.

As described previously, in the present embodiment, the outer multi-phase coil 26, the inner multi-phase coil 24 and the bridging parts 15 are formed of a plurality of U-shaped conductors UC that are mounted on the outer and inner stators 14 and 17 and joined to one another by, for example, welding. As shown in FIG. 9, each of the U-shaped conductors UC consists of: one outer coil part 26a that constitutes a part of the outer multi-phase coil 26; one inner coil part 24a that constitutes a part of the inner multi-phase coil 24; and one bridging part 15 that bridges the outer coil part 26a and the inner coil part 24a.

The outer coil part 26a includes an oblique portion 26b and a joining portion 26j in addition to an in-slot portion that is received in one of slots 14s formed in the stator core 14c of the outer stator 14. The oblique portion 26b extends obliquely with respect to a radial direction of the outer stator 14 (see FIG. 17). The joining portion 26j is a distal end portion of the outer coil part 26a.

For each corresponding pair of the outer coil parts 26a of the U-shaped conductors UC, which are respectively received in two different ones of the slots 14s of the outer stator 14, the joining portions 26j of the corresponding pair of the outer coil parts 26a are joined by, for example, welding.

Similarly, the inner coil part 24a includes an oblique portion 24b and a joining portion 24j in addition to an in-slot portion that is received in one of the slots 17s formed in the stator core 17c of the inner stator 17. The oblique portion 24b extends obliquely with respect to a radial direction of the inner stator 17 (see FIG. 22). The joining portion 24j is a distal end portion of the inner coil part 24a.

For each corresponding pair of the inner coil parts 24a of the U-shaped conductors UC, which are respectively received in two different ones of the slots 17s of the inner stator 17, the joining portions 24j of the corresponding pair of the inner coil parts 24a are joined by, for example, welding.

In addition, for each common phase of the outer and inner multi-phase coils 26 and 24, a predetermined number of the U-shaped conductors UC are joined to one another to form a single winding of the common phase.

Figure 10:
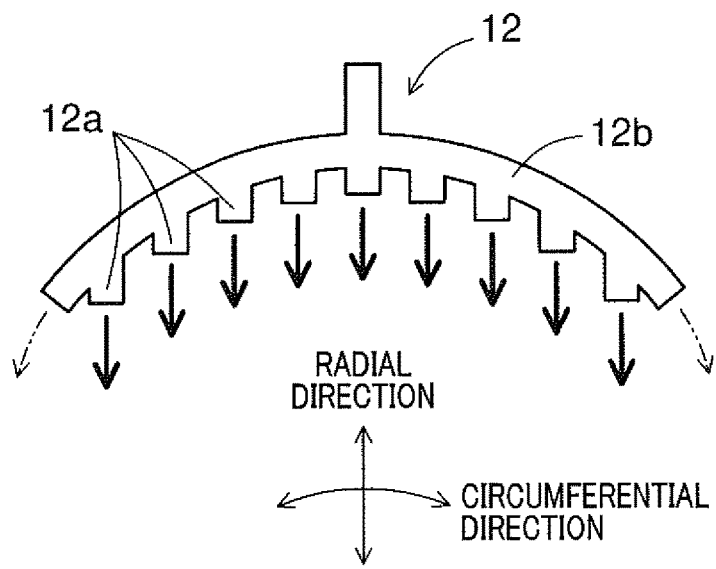
FIG. 10 is a schematic view illustrating the configuration of a second coolant introduction portion formed in a housing of the double-stator rotating electric machine.

In the present embodiment, as shown in FIG. 10, the second coolant introduction portion 12 is configured to include a plurality of inlets 12a, through which the coolant 20 is introduced into the internal space of the housing 13, and a guide passage 12b that guides the coolant 20 to the inlets 12a. The number of the inlets 12a may be set to any suitable number. The guide passage 12b has, for example, an arc-shape as shown in FIG. 10.

The second coolant introduction portion 12 is provided to discharge the coolant 20, which is drawn up by the pump 19, mainly onto the bridging parts 15 of the U-shaped conductors UC. The bridging parts 15 are arranged in the circumferential direction of the rotor 16 as shown in FIG. 5. Therefore, by discharging the coolant 20 via the plurality of inlets 12a, it is possible to deliver the coolant 20 to all the bridging parts 15, thereby thoroughly cooling the bridging parts 15.

In addition, though not shown in the figures, the first coolant introduction portion 11 is configured in the same manner as the above-described second coolant introduction portion 12.

Figure 11:
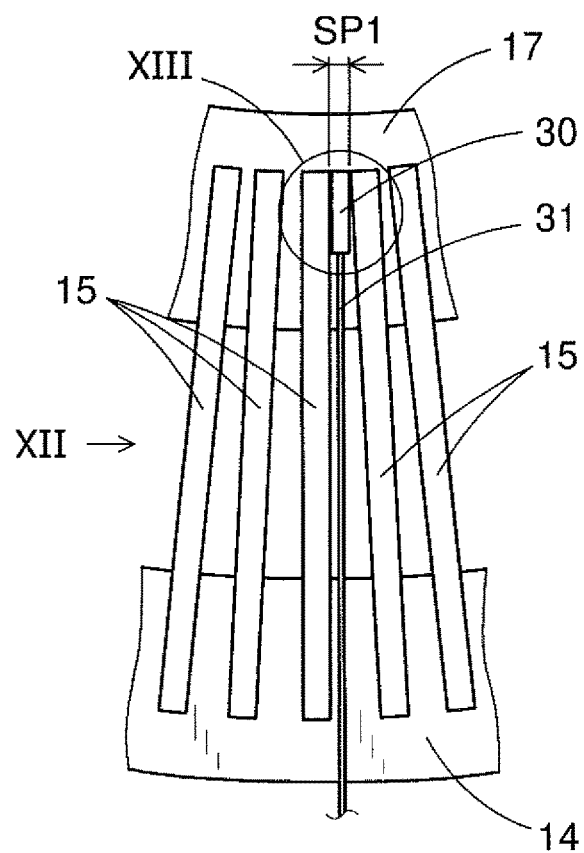
FIG. 11 is a schematic view illustrating the arrangement of a temperature sensing element in the double-stator rotating electric machine.
Figure 12:
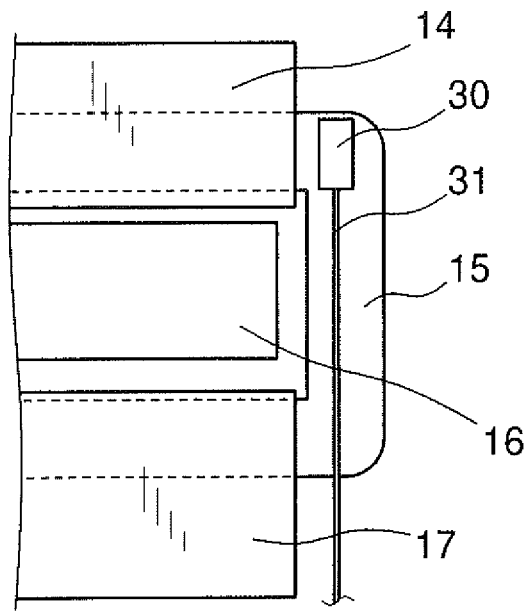
FIG. 12 is a view along the direction XII in FIG. 11.

In the present embodiment, as shown in FIGS. 11-12, the temperature sensing element 30 is arranged in a space SP1 between an adjacent pair of the bridging parts 15 of the U-shaped conductors UC to sense the temperature θ of the U-shaped conductors UC. The temperature sensing element 30 may be implemented by, for example, a thermistor. Moreover, a signal wire 31 is connected to the temperature sensing element 30 to convey a signal, which is outputted from the temperature sensing element 30 and indicative of the temperature θ sensed by the temperature sensing element 30, to the control device (not shown).

Since the bridging parts 15 are arranged in a radial manner, the space SP1 between the adjacent pair of the bridging parts 15 tapers radially inward. Therefore, regardless of the size of the temperature sensing element 30, it is possible to securely retain the temperature sensing element 30 in the space SP1 by radially inserting the temperature sensing element 30 from the radially outer side (i.e., the wider side) of the space SP1 to the radially inner side (i.e., the narrower side).

In addition, it should be noted that for the sake of simplicity, in FIGS. 11-12, the bridging parts 15 are depicted as extending straight without having the respective bent portions 15b described above.

Figure 13:
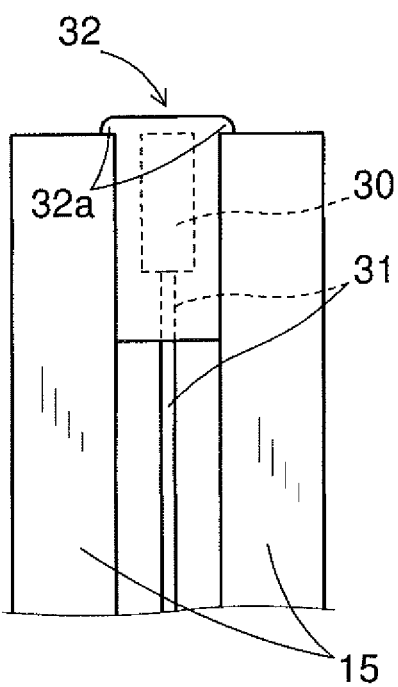
FIG. 13 is an enlarged view of the region XIII circled in FIG. 11.

Moreover, as shown in FIG. 13, the temperature sensing element 30 may be further fixed by a fixing member 32. The fixing member 32 may be formed of for example, an electrically-insulative resin that can be melted at a temperature within a heatproof temperature range of the temperature sensing element 30. In this case, the resin is first melted and then applied so as to cover the temperature sensing element 30 and form a pair of protrusions 32a respectively on the radially inner ends of the adjacent pair of the bridging parts 15. The protrusions 32a of the fixing member 32 function as hooks to prevent the fixing member 32 and the temperature sensing element 30 from being moved radially outward. In other words, the fixing member 32 is thermally crimped on the radially inner ends of the adjacent pair of the bridging parts 15.

Figure 14:
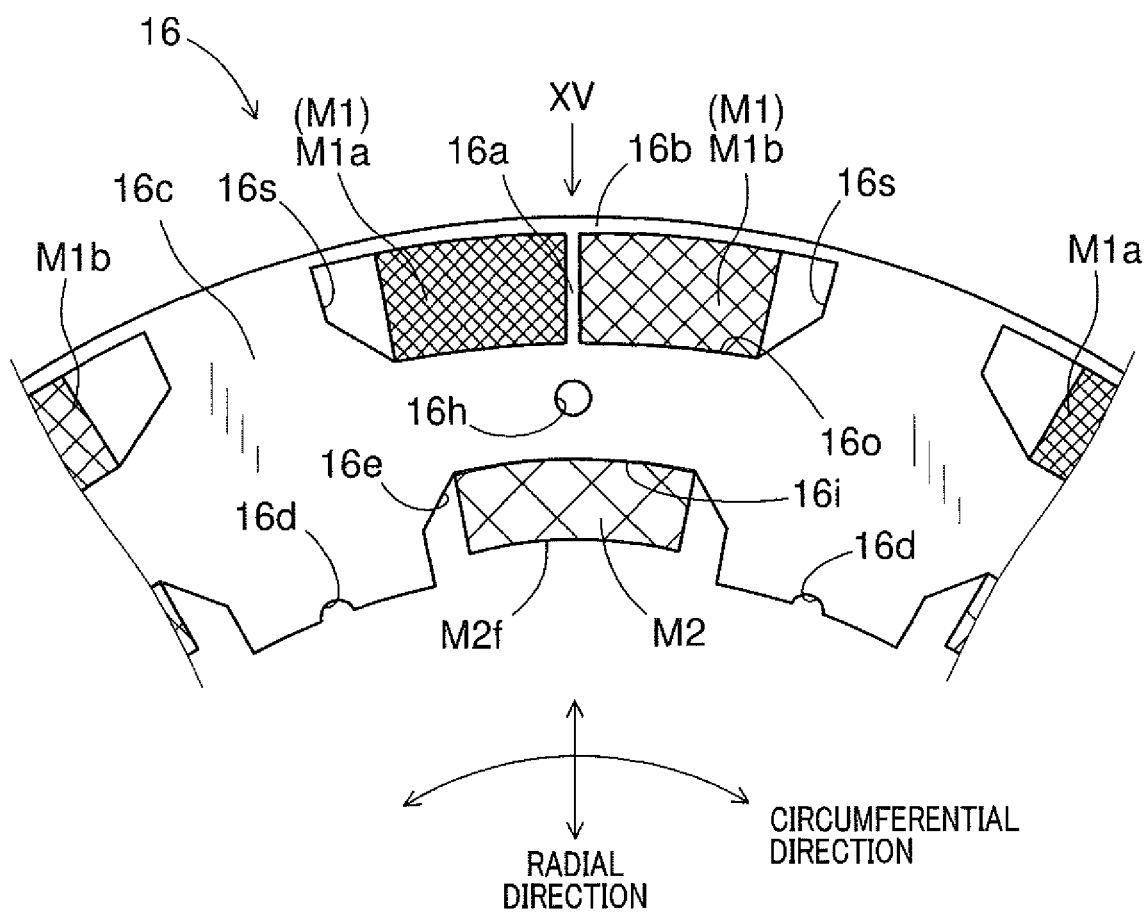
FIG. 14 is an enlarged plan view of part of the rotor.

In the present embodiment, as shown in FIG. 14, the rotor 16 includes an annular (or hollow cylindrical) rotor core 16c, a plurality of outer permanent magnets M1 and a plurality of inner permanent magnets M2.

Figure 15:
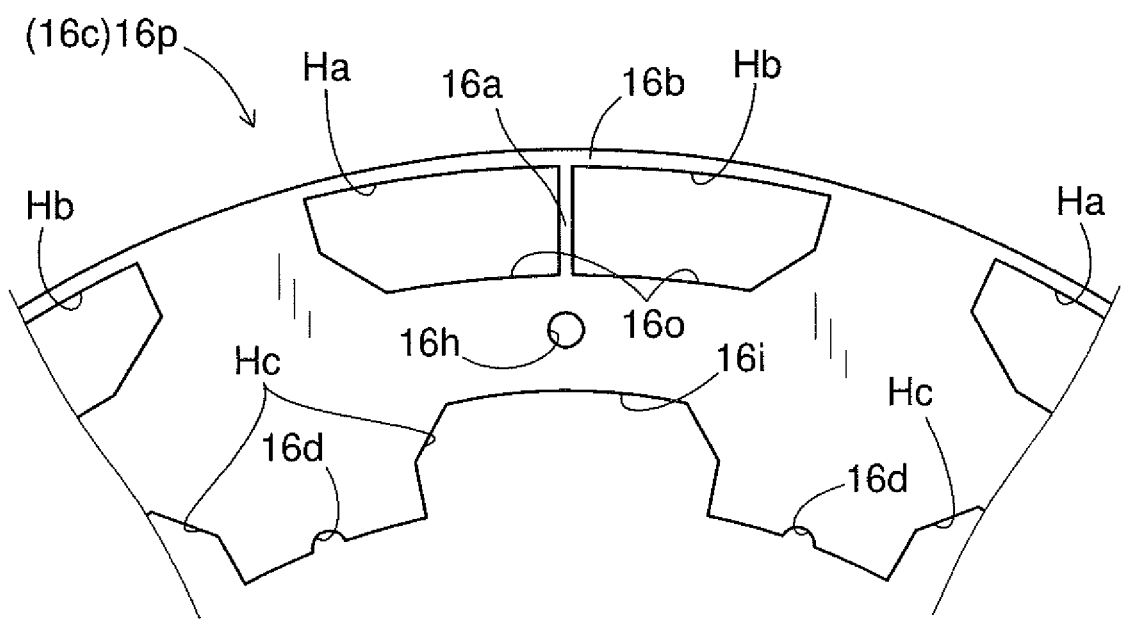
FIG. 15 is an enlarged plan view of part of one of magnetic steel sheets that are laminated to form a rotor core of the rotor.

The rotor core 16c is formed of a plurality of magnetic steel sheets 16p that are shaped as shown in FIG. 15 and laminated in the axial direction of the rotor core 16c. In addition, it is possible to easily set the axial length of the rotor core 16c to a desired value by adjusting either the thickness or the number of the magnetic steel sheets 16p.

The rotor core 16c has a plurality of magnet-receiving holes 16s, a plurality of through-holes 16h, a plurality of grooves 16d and a plurality of magnet-receiving recesses 16e.

Each of the magnet-receiving holes 16s is formed in close vicinity to a radially outer surface of the rotor core 16c and receives a corresponding one of the outer permanent magnets M1 therein. Moreover, each of the magnet-receiving holes 16s is formed so as to have a larger size than the corresponding outer permanent magnet M1 received therein. In other words, each of the magnet-receiving holes 16s is formed so as to have a vacant space unoccupied by the corresponding outer permanent magnet M1. In addition, the magnet-receiving holes 16s are circumferentially spaced from one another at predetermined intervals.

Figure 17:
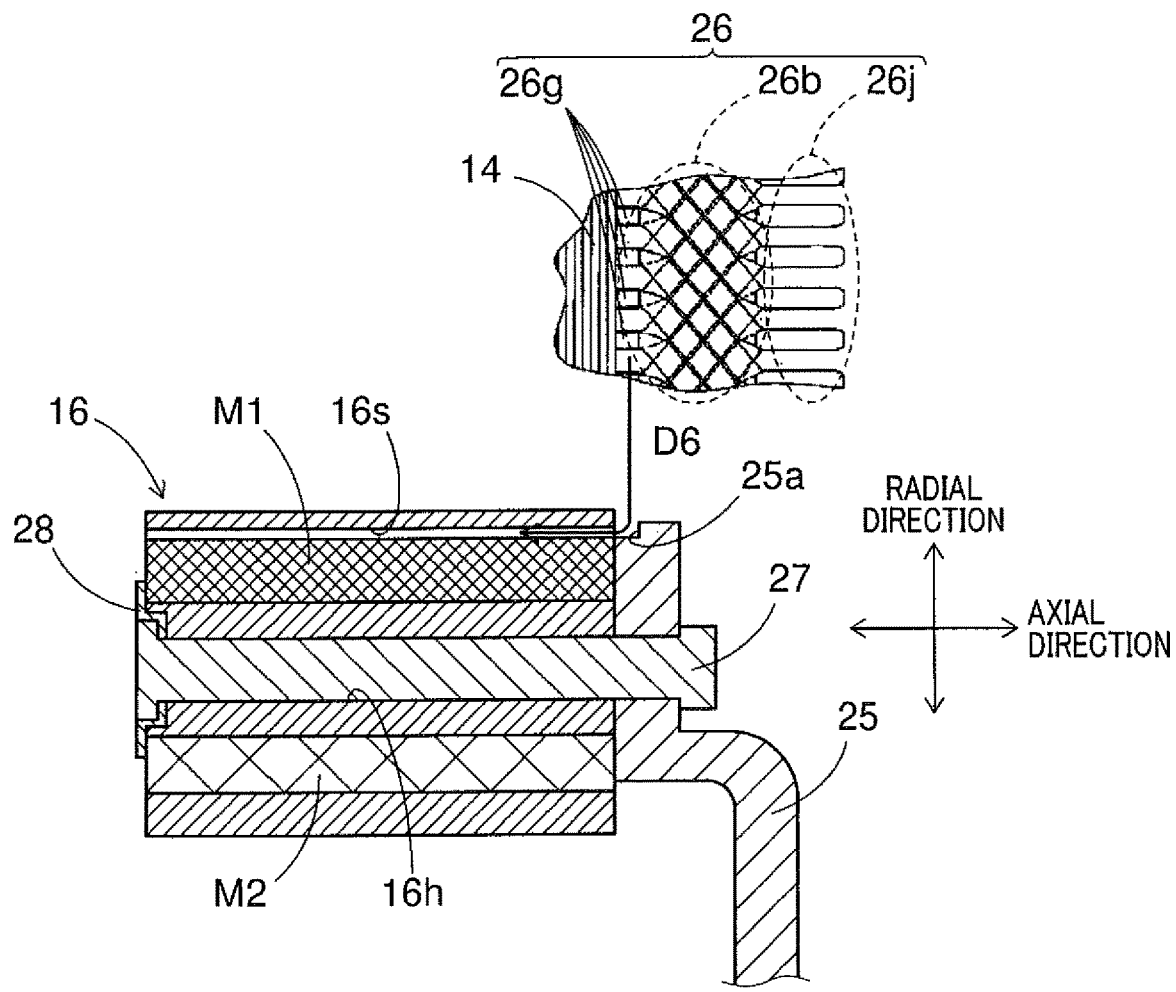
FIG. 17 is a schematic cross-sectional view illustrating the arrangement of an outer multi-phase coil, the rotor and the disc in the double-stator rotating electric machine.

Each of the through-holes 16h is formed so as to allow a fixing member 27, which fixes the rotor core 16c to the disc 25, to extend through the through-hole 16h (see FIG. 17).

Each of the magnet-receiving recesses 16e is formed in a radially inner surface of the rotor core 16c and receives a corresponding one of the inner permanent magnets M2 therein. In addition, the magnet-receiving recesses 16e are circumferentially spaced from one another at predetermined intervals.

Each of the grooves 16d is formed in the radially inner surface of the rotor core 16c so as to have a semicircular cross section perpendicular to the axial direction of the rotor core 16c. Moreover, each of the grooves 16d is circumferentially positioned between one adjacent pair of the magnet-receiving recesses 16e.

Each of the outer permanent magnets M1 is fixed to a radially inner wall surface 16o of the corresponding magnet-receiving hole 16s. On the other hand, each of the inner permanent magnets M2 is fixed to a bottom wall surface 16i of the corresponding magnet-receiving recess 16e. Moreover, each of the inner permanent magnets M2 has an exposed surface M2f on the radially inner side.

In addition, the outer permanent magnets M1 and the inner permanent magnets M2 may be fixed to the rotor core 16c by any suitable fixing means. The number of the outer permanent magnets M1 and the number of the inner permanent magnets M2 provided in the rotor 16 may be suitably set according to, for example, the number of magnetic pole pairs corresponding to the number of phases. Further, each of the outer and inner permanent magnets M1 and M2 may be either formed as a single piece or divided into a plurality of permanent magnet segments.

In the present embodiment, each of the outer permanent magnets M1 is comprised of a pair of permanent magnet segments M1a and M1b, which are shown in FIG. 14 with different hatch lines for distinction. On the other hand, each of the inner permanent magnets M2 is formed as a single piece. In addition, the outer permanent magnets M1 and the inner permanent magnets M2 are respectively magnetized in opposite radial directions.

In the rotor core 16c, for each of the magnet-receiving holes 16s, there is formed a bridge portion 16b that bridges (or connects) two yoke portions respectively on opposite circumferential sides of the magnet-receiving hole 16s. The bridge portion 16b covers, either partially or completely, the outer permanent magnet M1 (i.e., the permanent magnet segments M1a and M1b) received in the magnet-receiving hole 16s. In addition, it is preferable to form the bridge portion 16b so as to smoothly connect the two yoke portions without causing irregularities in the radially outer surface of the rotor core 16c.

By forming in the rotor core 16c the bridge portions 16b that can constitute part of a magnetic circuit, the outer gap Go between the outer stator 14 and the rotor 16 is reduced, thereby making it easier for magnetic flux to flow across the outer gap Go. In addition, in terms of facilitating the flow of magnetic flux, it is preferable for the radial thickness of the bridge portions 16b to be small. On the other hand, in terms of securing the rigidity of the bridge portions 16b, it is preferable for the radial thickness of the bridge portions 16b to be large. Therefore, the radial thickness of the bridge portions 16b may be preferably set by taking both the above factors into consideration.

Moreover, in the rotor core 16c, for each of the magnet-receiving holes 16s, there is formed a separation portion 16a that radially extends so as to separate the permanent magnet segments M1a and M1b received in the magnet-receiving hole 16s from each other. In addition, the separation portion 16a and the bridge portion 16b together form a substantially T-shape.

FIG. 15 shows the configuration of the magnetic steel sheets 16p that are laminated to form the rotor core 16c. As seen from the figure, each of the magnetic steel sheets 16p has through-holes Ha and Hb for forming the magnet-receiving holes 16s of the rotor core 16c and recesses Hc for forming the magnet-receiving recesses 16e of the rotor core 16c.

Figure 16:
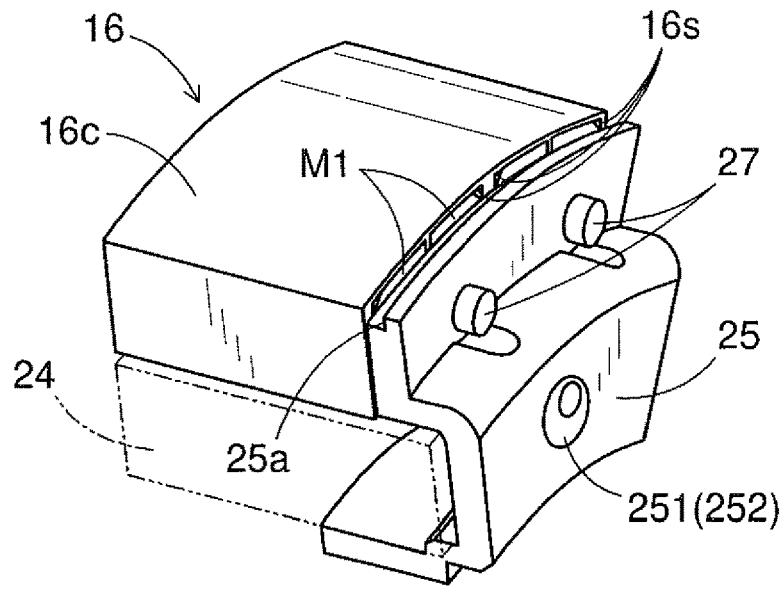
FIG. 16 is a perspective view illustrating the configuration of a disc of the double-stator rotating electric machine.

In the present embodiment, as shown in FIGS. 16-17, the disc 25 has a recess 25a formed at a corner between a radially outer surface of the disc 25 and an axial end surface of the disc 25 abutting the rotor 16. In the state where the rotor 16 and the disc 25 are fixed by the fixing members 27 and seat members 28, the recess 25a of the disc 25 and an axial end surface of the rotor 16 abutting the disc 25 together define an annular groove.

The fixing members 27 may be made of any suitable material. However, in terms of facilitating the flow of magnetic flux, it is preferable for the fixing members 27 to be made of a magnetic material.

Each of the fixing members 27 has a flange formed at one end (i.e., the left end in FIG. 17) thereof. Moreover, each of the fixing members 27 is inserted in one of the through-holes 16h of the rotor core 16c and one of through-holes of the disc 25 such that: one of the seat members 28 is interposed between the flange of the fixing member 27 and the rotor 16; and the other end (i.e., the right end in FIG. 17) of the fixing member 27 protrudes outside the through-hole of the disc 25 and is crimped on an axial end surface of the disc 25 facing away from the rotor 16. Consequently, the seat members 28 are brought into the state of pressing and thereby retaining the rotor core 16c, the outer permanent magnets M1 and the inner permanent magnets M2.

Alternatively, though not shown in the figures, each of the fixing members 27 may have a male-threaded portion formed at the other end thereof; and the male-threaded portion may be fastened into one of female-threaded holes formed in the disc 25. Further, each of the fixing members 27 may be welded to the disc 25 with the male-threaded portion of the fixing member 27 fastened in the female-threaded hole of the disc 25.

As shown in FIG. 17, the recess 25a of the disc 25 communicates with the magnet-receiving holes 16s of the rotor core 16c. Therefore, the coolant 20, which flows down through void spaces formed between standing portions 26g of the outer multi-phase coil 26, will flow as indicated by the arrow line D6 in FIG. 17. That is, the coolant 20 first enters the recess 25a of the disc 25 and then flows into the vacant spaces in the magnet-receiving holes 16s of the rotor core 16c which are unoccupied by the outer permanent magnets M1. Consequently, with the coolant 20 flowing in the above manner, it is possible to cool the outer permanent magnets M1 as well as the outer multi-phase coil 26. In addition, the standing portions 26g here denote those portions of the outer multi-phase coil 26 which axially stand from the axial end face of the stator core 14c of the outer stator 14.

Figure 18:
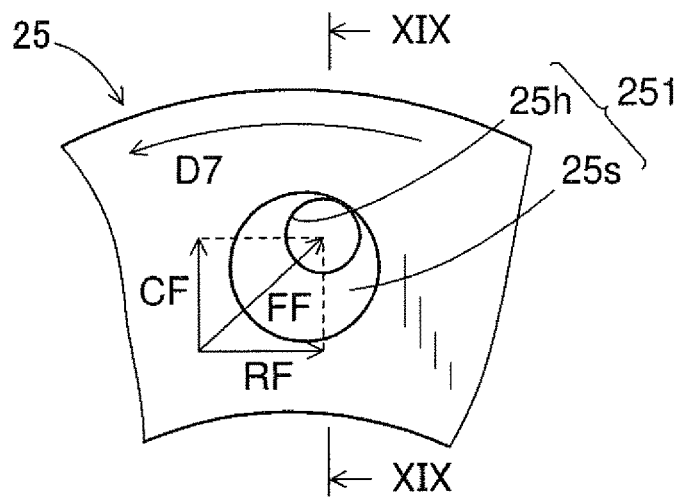
FIG. 18 is a plan view illustrating the configuration of a first through-hole formed in the disc.
Figure 19:
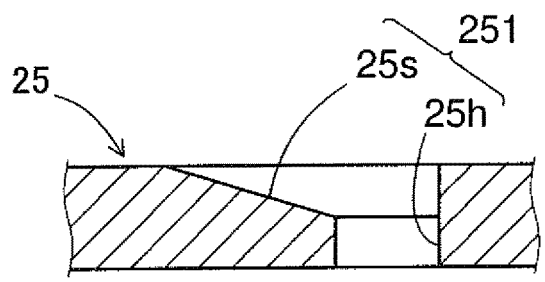
FIG. 19 is a cross-sectional view taken along the line XIX-XIX in FIG. 18.

In the present embodiment, as shown in FIGS. 18-19, the disc 25 has at least one first through-hole 251 formed therein. In addition, the number of the first through-holes 251 may be set to any suitable number.

The first through-hole 251 is formed in the disc 251 so as to face the inner multi-phase coil 24 (see FIG. 16). Moreover, the first through-hole 251 has a first part 25h on the inner multi-phase coil 24 side and a second part 25s on the opposite side of the first part 25h to the inner multi-phase coil 24. The first part 25h is formed so as to extend in the axial direction of the disc 25 (or the axial direction of the rotor 16). The second part 25s is formed so as to be closer than the first part 25h to the rotating shaft 23 and have an inner wall surface extending obliquely with respect to the axial direction of the disc 25 (i.e., the direction perpendicular to the paper surface of FIG. 18 and the vertical direction in FIG. 19). The first part 25h and the second part 25s each have a circular shape in plan view. Moreover, the first part 25h and the second part 25s are aligned in the direction of a resultant force FF as shown FIG. 18. Here, the resultant force FF is the resultant of the centrifugal force CF acting on the coolant 20 passing through the first through-hole 251 and the rotating force RF applied by the disc 25 to the coolant 20.

In operation, with rotation of the disc 25, the coolant 20, which has entered the second part 25s of the first through-hole 251, flows in the direction of the resultant force FF. Since the first and second parts 25h and 25s of the first through-hole 251 are aligned in the direction of the resultant force FF, the coolant 20 can be reliably guided by the first through-hole 251 to the inner multi-phase coil 24, thereby cooling the inner multi-phase coil 24.

In addition, in the present embodiment, the first through-hole 251 is configured so that the first part 25h is inscribed in the second part 25s as shown in FIG. 18. However, the first through-hole 251 may also be modified to have other configurations as shown in FIGS. 20A-20D.

Figure 20A:
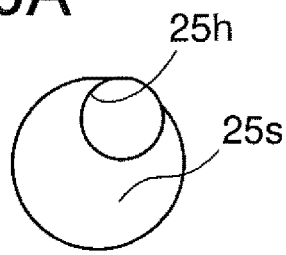
FIGS. 20A, 20B, 20C and 20D are schematic views illustrating first to fourth modifications of the first through-hole.

Specifically, in the first modification shown in FIG. 20A, the first through-hole 251 is configured so that the first part 25h slightly protrudes outside the second part 25s in the direction of the resultant force FF.

Figure 20B:
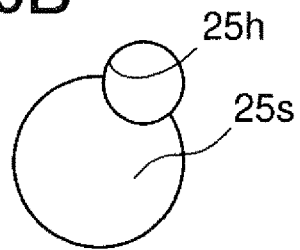

In the second modification shown in FIG. 20B, the first through-hole 251 is configured so that more than half of the first part 25h protrudes outside the second part 25s in the direction of the resultant force FF.

Figure 20C:
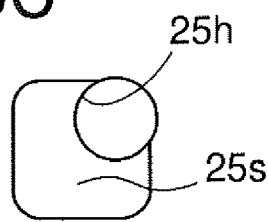
Figure 20D:
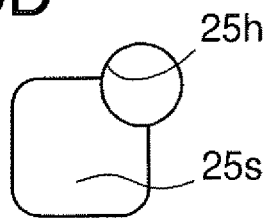

The third and fourth modifications shown in FIGS. 20C and 20D are respectively similar to the first and second modifications shown in FIGS. 20A and 20B. However, in the third and fourth modifications, the second part 25s of the first through-hole 251 has a square shape in plan view, instead of the circular shape in the first and second modifications.

In addition, though not shown in the figures, the first and second parts 25h and 25s of the first through-hole 251 may also have any shape in plan view other than the above-described circular and square shapes, such as an elliptical shape, a rectangular shape or any polygonal shape other than a quadrangular shape. The inner wall surface of the second part 25s of the first through-hole 251 may also be curved instead of being straight as shown in FIG. 19.

Figure 21:
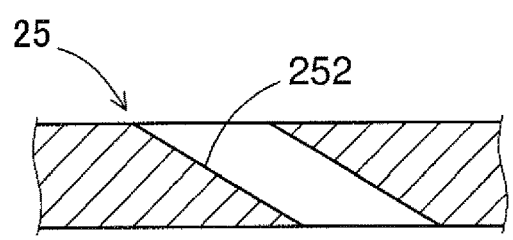
FIG. 21 is a cross-sectional view illustrating the configuration of a second through-hole formed in the disc.

Moreover, the disc 25 may have at least one second through-hole 252 instead of or in addition to the first through-hole 251. In this case, the second through-hole 252 is also formed in the disc 25 so as to face the inner multi-phase coil 24 (see FIG. 16). Moreover, as shown in FIG. 21, the entire second through-hole 252 extends obliquely with respect to the axial direction of the disc 25 (i.e., the vertical direction in FIG. 21). More specifically, the entire second through-hole 252 extends in the direction of the resultant force FF shown in FIG. 18.

In addition, the second through-hole 252 may have a larger diameter on the opposite side to the inner multi-phase coil 24 (i.e., the upper side in FIG. 21) than on the inner multi-phase coil 24 side (i.e., the lower side in FIG. 21). The number of the second through-holes 252 may also be set to any suitable number.

Figure 22:
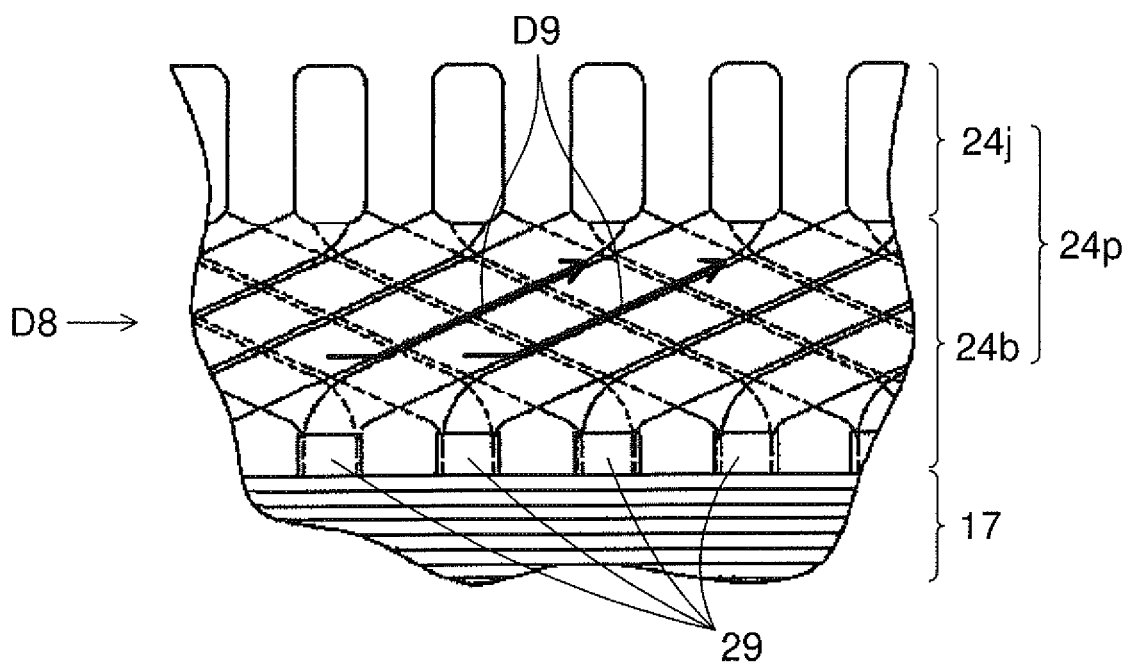
FIG. 22 is a schematic view illustrating the configuration of a protruding part of an inner multi-phase coil mounted on the inner stator.

In the present embodiment, as shown in FIG. 22, the inner multi-phase coil 24 has a protruding part 24p that protrudes from the inner stator 17. The protruding part 24p includes the oblique portions 24b and joining portions 24j of the inner coil parts 24a of the U-shaped conductors UC. As described previously, each of the oblique portions 24b extends obliquely with respect to a radial direction of the inner stator 17, i.e., extends obliquely with respect to the direction of rotation of the rotor 16 (i.e., the direction D8 in FIG. 22). Consequently, with the oblique portions 24b, it is possible to easily join each corresponding pair of the inner coil parts 24a of the U-shaped conductors UC, which are respectively received in two different ones of the slots 17s of the inner stator 17, at their joining portions 24j.

In operation, with rotation of the rotor 16, the coolant 20 adhered to the rotor 16 is spattered by the centrifugal force. Since the protruding part 24p of the inner multi-phase coil 24 includes the oblique portions 24b, the coolant 20 spattered on the protruding part 24p flows along the oblique portions 24b (i.e., in the direction D9 in FIG. 22) and then falls down from the protruding part 24. Consequently, without the coolant 20 remaining on the oblique portions 24b, it is possible to effectively cool the protruding part 24p. As a result, the cooling performance of the entire rotating electric machine 10A is improved.

In addition, an insulating material 29 may be applied to the inner multi-phase coil 24 (more particularly, to the in-slot portions of the inner multi-phase coil 24 received in the slots 17s of the inner stator 17). Similarly, though not shown in the figures, the insulating material 29 may also be applied to the outer multi-phase coil 26 (more particularly, to the in-slot portions of the outer multi-phase coil 26 received in the slots 14s of the outer stator 14). Consequently, with the insulating material 29, it is possible to prevent insulating coats formed on the surfaces of the inner and outer multi-phase coils 24 and 26 from being damaged during the mounting of the coils 24 and 26 (i.e., the U-shaped conductors UC) to the inner and outer stators 17 and 14.

Next, advantages of the double-stator rotating electric machine 10A according to the present embodiment will be descried hereinafter.

In the present embodiment, the rotating electric machine 10A includes the rotor 16, the outer stator 14 that is disposed radially outside the rotor 16 with the outer gap Go formed therebetween, and the inner stator 17 that is disposed radially inside the rotor 16 with the inner gap Gi formed therebetween. The outer stator 14 has the outer multi-phase coil 26 wound thereon, while the inner stator 17 has the inner multi-phase coil 24 wound thereon. The inner gap Gi formed between the inner stator 17 and the rotor 16 is set to be larger than the outer gap Go formed between the outer stator 14 and the rotor 16 (see FIGS. 1-3).

Setting the inner gap Gi as above, it becomes easy for the coolant 20 to flow through the inner gap Gi, increasing the flow rate of the coolant 20. Moreover, due to the centrifugal force created with rotation of the rotor 16, the coolant 20 flowing through the inner gap Gi cools not only the inner stator 17, but also the outer multi-phase coil 26 and the outer stator 14. Consequently, it becomes possible to improve the cooling performance of the entire rotating electric machine 10A, thereby increasing the output of the rotating electric machine 10A.

In addition, as described previously, in the present embodiment, the rotating electric machine 10A is configured as a motor-generator. Therefore, the output of the rotating electric machine 10A denotes the output torque when the machine 10A functions as an electric motor and the output electric power when the machine 10A functions as an electric generator.

In the present embodiment, the rotating electric machine 10A includes the plurality of U-shaped conductors UC. Each of the U-shaped conductors UC consists of: one outer coil part 26a that constitutes a part of the outer multi-phase coil 26; one inner coil part 24a that constitutes a part of the inner multi-phase coil 24; and one bridging part 15 that bridges the outer coil part 26a and the inner coil part 24a. The inner stator 17 has the plurality of slots 17s formed therein. In each of the slots 17s of the inner stator 17, there are received the inner coil parts 24a of a predetermined number (e.g., four as shown in FIG. 7) of the U-shaped conductors UC. At least one of the predetermined number of the U-shaped conductors UC, more particularly each of the four U-shaped conductors UC in the present embodiment has the twisted portion 15a formed in the bridging part 15 on the inner stator 17 side. The twisted portion 15a is twisted by an angle within the predetermined range of, for example, 45 to 135°, more particularly by 90° in the present embodiment.

With the above configuration, part of the coolant 20 flowing down along the bridging parts 15 of the U-shaped conductors UC is changed in speed and direction by the twisted portions 15a of the bridging parts 15. More specifically, part of the coolant 20 flowing down along the bridging parts 15 is guided by the twisted portions 15a of the bridging parts 15 so as to flow along the inner multi-phase coil 24 into the slots 17s of the inner stator 17. Consequently, it is possible to more effectively cool the inner multi-phase coil 24 and the inner stator 17. As a result, it is possible to further improve the cooling performance of the entire rotating electric machine 10A, thereby further increasing the output of the rotating electric machine 10A.

In the present embodiment, each of the bridging parts 15 of the U-shaped conductors UC has the bent portion 15b formed therein. The bent portion 15b is bent in the direction D5 that is inclined in the direction D4 of rotation of the rotor 16 with respect to the radial direction of the rotor 16 (see FIG. 8).

With the above configuration, during rotation of the rotor 16, the coolant 20, which is spattered on the bridging parts 15 by the centrifugal force, is guided by the bent portions 15b to flow to the radially outer ends of the bridging parts 15. Consequently, without the coolant 20 remaining on the bridging parts 15, it is possible to effectively cool the bridging parts 15. As a result, the cooling performance of the entire rotating electric machine 10A is further improved, thereby further increasing the output of the rotating electric machine 10A.

In the present embodiment, the temperature sensing element 30 is arranged in the space SP1 between an adjacent pair of the bridging parts 15 of the U-shaped conductors UC to sense the temperature θ of the U-shaped conductors UC (see FIG. 11).

With the above arrangement, the temperature sensing element 30 is sandwiched between the pair of the bridging parts 15, thereby securing a large contact area of the temperature sensing element 30 with the bridging parts 15. Consequently, it is possible for the temperature sensing element 30 to accurately and stably sense the temperature θ of the U-shaped conductors UC. Moreover, it is also possible to prevent the temperature sensing element 30 from protruding from the pair of the bridging parts 15. Furthermore, since the space SP1 between the pair of the bridging parts 15 tapers radially inward, it is possible to securely retain the temperature sensing element 30, regardless of its size, in the space SP1 by radially inserting the temperature sensing element 30 from the radially outer side to the radially inner side of the space SP1. In addition, by controlling the flow rate of the coolant 20 based on the temperature θ sensed by the temperature sensing element 30, it is possible to further improve the cooling performance of the entire rotating electric machine 10A, thereby further increasing the output of the rotating electric machine 10A.

In the present embodiment, the rotor 16 includes the rotor core 16c and the plurality of inner permanent magnets M2 that are provided in the rotor core 16c so as to be closer to the radially inner surface than to the radially outer surface of the rotor core 16c. At least one of the inner permanent magnets M2, more particularly each of the inner permanent magnets M2 in the present embodiment has the exposed surface M2f directly facing the inner stator 17 (see FIG. 14).

With the above configuration, the exposed surfaces M2f of the inner permanent magnets M2 can be directly cooled by the coolant 20. Moreover, without additional members covering the exposed surfaces M2f, it is possible to reduce the manufacturing cost. In addition, it is also possible to increase the radial thickness of the inner permanent magnets M2, thereby enhancing the magnetic force of the inner permanent magnets M2.

In the present embodiment, the rotating electric machine 10A includes the disc 25 that connects the rotating shaft 23 and the rotor core 16c of the rotor 16. The rotor core 16c has the plurality of magnet-receiving holes 16s formed in close vicinity to the radially outer surface of the rotor core 16c. The rotor 16 includes the plurality of outer permanent magnets M1 each of which is received in one of the magnet-receiving holes 16s of the rotor core 16c (see FIG. 14). The outer multi-phase coil 26 has the plurality of standing portions 26g that axially stand from the axial end face of the stator core 14c of the outer stator 14 with void spaces formed therebetween. The disc 25 has the recess 25a formed at the corner between the radially outer surface of the disc 25 and the axial end surface of the disc 25 abutting the rotor 16. The recess 25a communicates with the magnet-receiving holes 16s of the rotor core 16c and is radially aligned with the void spaces formed between the standing portions 26g of the outer multi-phase coil 26 (see FIGS. 16-17).

With the above configuration, the coolant 20, which flows down through the void spaces formed between the standing portions 26g of the outer multi-phase coil 26, first enters the recess 25a of the disc 25 and then flows into the vacant spaces in the magnet-receiving holes 16s of the rotor core 16c which are unoccupied by the outer permanent magnets M1. Consequently, with the coolant 20 flowing in the above manner, it is possible to cool the outer permanent magnets M1 as well as the outer multi-phase coil 26.

In the present embodiment, the rotor core 16c has the plurality of grooves 16d each of which is formed in the radially inner surface of the rotor core 16c so as to be circumferentially positioned between one adjacent pair of the inner permanent magnets M2 (see FIGS. 14-15).

With the above configuration, the coolant 20 also enters the recesses 16d, thereby more effectively cooling the rotor core 16c from the radially inner side.

In the present embodiment, the disc 25 has at least one first through-hole 251 that is formed in the disc 25 so as to face the inner multi-phase coil 24. The first through-hole 251 has the first part 25h on the inner multi-phase coil 24 side and the second part 25s on the opposite side of the first part 25h to the inner multi-phase coil 24. The first part 25h is formed so as to extend in the axial direction of the disc 25. The second part 25s is formed so as to be closer than the first part 25h to the rotating shaft 23 and have its inner wall surface extending obliquely with respect to the axial direction of the disc 25 (see FIGS. 16 and 18-19).

With the above configuration, the coolant 20, which has entered the second part 25s of the first through-hole 251, flows in the direction of the resultant force FF (see FIG. 18), thereby being reliably guided to the inner multi-phase coil 24. Consequently, it is possible to more effectively cool the inner multi-phase coil 24.

In addition, the disc 25 may have at least one second through-hole 252 instead of or in addition to the first through-hole 251. The second through-hole 252 is also formed in the disc 25 so as to face the inner multi-phase coil 24 (see FIG. 16). Moreover, the entire second through-hole 252 extends obliquely with respect to the axial direction of the disc 25 (i.e., the vertical direction in FIG. 21). With the second through-hole 252, it is also possible to reliably guide the coolant 20 to the inner multi-phase coil 24, thereby more effectively cooling the inner multi-phase coil 24.

In the present embodiment, the inner multi-phase coil 24 has the protruding part 24p that protrudes from the inner stator 17. The protruding part 24 includes the plurality of oblique portions 24b each of which extends obliquely with respect to the direction of rotation of the rotor 16 (see FIG. 22).

With the above configuration, during rotation of the rotor 16, the coolant 20, which is spattered on the protruding part 24p by the centrifugal force, flows along the oblique portions 24b (i.e., in the direction D9 in FIG. 22) and then falls down from the protruding part 24. Consequently, without the coolant 20 remaining on the oblique portions 24b, it is possible to effectively cool the protruding part 24p. As a result, the cooling performance of the entire rotating electric machine 10A is further improved.

In the present embodiment, the outer stator 14 has the stator core 14c on which the outer multi-phase coil 26 is wound. The inner stator 17 has the stator core 17c on which the inner multi-phase coil 24 is wound. The axial thickness Wi of the stator core 17c of the inner stator 17 is set to be smaller than the axial thickness Wo of the stator core 14c of the outer stator 14 (see FIG. 2).

Setting the axial thickness Wi as above, it is possible to reduce the volume of the inner stator 17. Consequently, it is possible to more effectively cool the inner stator 17 with the same amount of the coolant 20. Moreover, it is also possible to reduce the axial protruding height of the disc 25 from the rotor 16, thereby minimizing the axial length of the entire rotating electric machine 10A (see FIG. 1).

In the present embodiment, the axial length Lm2 of the inner permanent magnets M2 is set to be smaller than the axial length Lm1 of the outer permanent magnets M1 (see FIG. 4).

Setting the axial length Lm2 as above, it is possible to widen the magnetic path in the rotor core 16c available for magnetic flux created by the outer permanent magnets M1 and the outer stator 14. As a result, it is possible to relax magnetic saturation of the rotor core 16c, thereby increasing the output of the rotating electric machine 10A.

Second Embodiment

Figure 23:
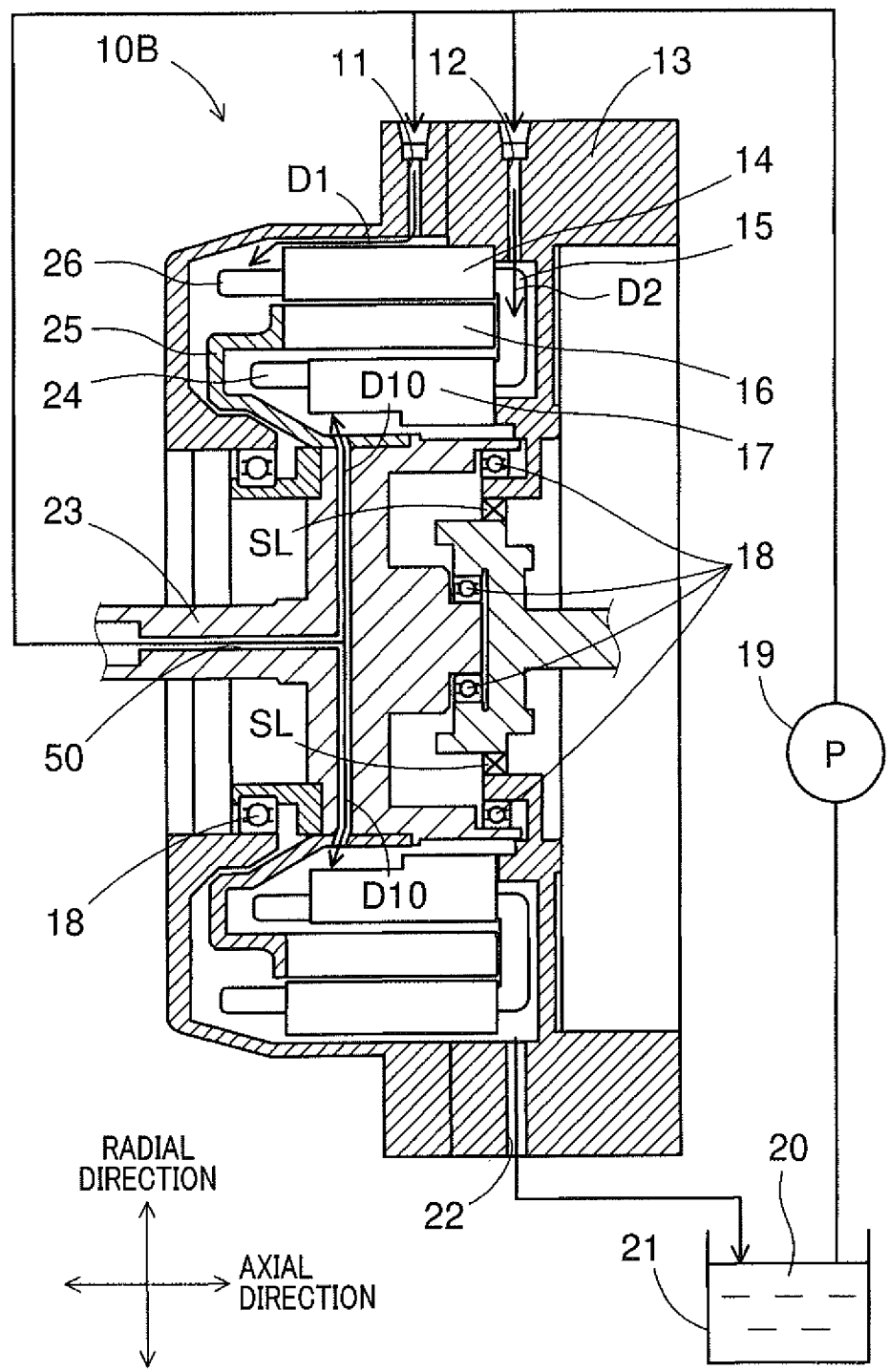
FIG. 23 is a cross-sectional view of a double-stator rotating electric machine according to a second embodiment.

FIG. 23 shows the overall configuration of a double-stator rotating electric machine 10B according to a second embodiment.

As seen from FIG. 23, the configuration of the double-stator rotating electric machine 10B according to the present embodiment is almost identical to that of the double-stator rotating electric machine 10A according to the first embodiment (see FIG. 1). Accordingly, only the differences therebetween will be described hereinafter.

In the first embodiment, the rotating electric machine 10A includes only the first and second coolant introduction portions 11 and 12 formed in the housing 13 (see FIG. 1).

In comparison, in the present embodiment, as shown in FIG. 23, the rotating electric machine 10B further includes a third coolant introduction portion 50 in addition to the first and second coolant introduction portions 11 and 12. The third coolant introduction portion 50 is formed in the rotating shaft 23, unlike the first and second coolant introduction portions 11 and 12 formed in the housing 13.

In operation, with rotation of the rotating shaft 23, the coolant 20, which is introduced via the third coolant introduction portion 50, is discharged by the centrifugal force radially outward as indicated by the arrow line D10 in FIG. 23. Consequently, with the coolant 20, it is possible to more effectively cool the rotating shaft 23, the inner stator 17 and the inner multi-phase coil 24.

While the above particular embodiments have been shown and described, it will be understood by those skilled in the art that various modifications, changes, and improvements may be made without departing from the spirit of the present invention.

(1) In the above-described embodiments, the twisted portions 15a of the bridging parts 15 of the U-shaped conductors UC are formed on the inner stator 17 side so that there are no void spaces between the twisted portions 15a (see FIG. 7).

Figure 24:
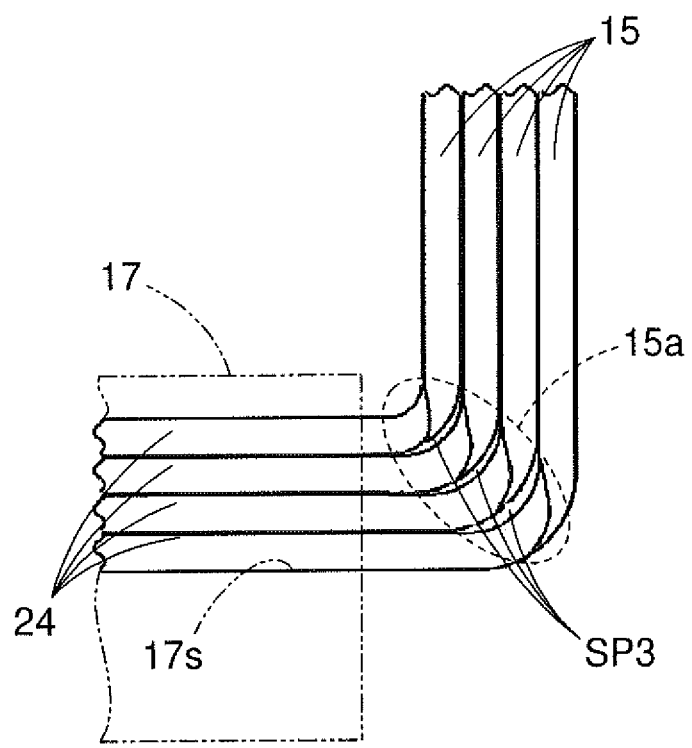
FIG. 24 is a view illustrating the configuration of the bridging parts of the U-shaped conductors according to a modification.

However, as shown in FIG. 24, the twisted portions 15a of the bridging parts 15 may also be formed on the inner stator 17 side so that there are spaces SP3 between the twisted portions 15a. More specifically, the twisted portions 15a may be formed to have different radii of curvature, resulting in the spaces SP3 therebetween. In this case, part of the coolant 20 flowing down along the bridging parts 15 flows as indicated by the arrow lines D3 in FIG. 7; and the remaining coolant 20 flows further downward via the spaces SP3 to other bridging parts 15 located under the bridging parts 15. Consequently, it is possible to more effectively cool all the bridging parts 15 of the U-shaped conductors UC.

(2) In the above-described embodiments, each of the outer permanent magnets M1 is comprised of a pair of permanent magnet segments M1a and M1b; and each of the inner permanent magnets M2 is formed as a single piece (see FIG. 14).

However, each of the outer permanent magnets M1 may also be comprised of three or more permanent magnet segments. Each of the inner permanent magnets M2 may also be comprised of two or more permanent magnet segments.

Moreover, in the case where each of the inner permanent magnets M2 is also comprised of a plurality of permanent magnet segments, it is preferable to set the number of permanent magnet segments per inner permanent magnet M2 to be less than the number of permanent magnet segments per outer permanent magnet M1. Furthermore, in this case, the rotor core may further have a plurality of separation portions each of which radially extends so as to separate a circumferentially-adjacent pair of the permanent magnet segments of the inner permanent magnets M2.

(3) In the above-described embodiments, the present invention is directed to the double-stator rotating electric machines 10A and 10B that are configured as a motor-generator. However, the present invention can also be applied to other types of double-stator rotating electric machines, such as a double-stator electric motor or a double-stator electric generator.

(4) In the above-described embodiments, each of the inner permanent magnets M2 is received in a corresponding one of the magnet-receiving recesses 16e and fixed to the bottom wall surface 16i of the corresponding magnet-receiving recess 16e (see FIG. 14).

However, the rotor core 16c may be configured to further have a plurality of inner bridge portions each of which bridges (or connects) the two yoke portions respectively on opposite circumferential sides of one of the magnet-receiving recesses 16e. That is, each of the inner bridge portions closes the open end of one of the magnet-receiving recesses 16e, forming one inner magnet-receiving hole. Moreover, each of the inner permanent magnets M2 may be received and fixed in one of the inner magnet-receiving holes. In this case, with support of the inner bridge portions, it would be possible to more securely retain the inner permanent magnets M2 in the rotor 16. In addition, since the inner bridge portions could constitute part of a magnetic circuit, the gap Gi between the inner stator 17 and the rotor 16 would be reduced, thereby making it easier for magnetic flux to flow across the gap Gi.

(5) In the above-described embodiments, both the pump 19 and the coolant reservoir 21 are provided outside the housing 13 (see FIGS. 1 and 23). However, either or both of the pump 19 and the coolant reservoir 21 may also be provided in the housing 13.

(6) In the above-described embodiments, the double-stator rotating electric machines 10A and 10B include only the single pump 19 (see FIGS. 1 and 23). However, the double-stator rotating electric machines 10A and 10B may include a plurality of pumps 19, for example a pair of pumps 19 that deliver the coolant 20 respectively to the first and second coolant introduction portions 11 and 12. In this case, it is possible to more reliably cool the components of the rotating electric machine received in the housing 13 by severally controlling the coolant discharge rates of the pumps 19.

(7) In the above-described embodiments, there are formed both the first and second coolant introduction portions 11 and 12 in the top wall of the housing 13 (see FIGS. 1 and 23). However, it is possible to form only the second coolant introduction portion 12 in the top wall of the housing 13, omitting the first coolant introduction portion 11. Moreover, it is also possible to form either or both of the first and second coolant introduction portions 11 and 12 in other parts of the housing 13.

What is claimed is:

1. A double-stator rotating electric machine comprising:
   a rotor;
   an outer stator disposed radially outside the rotor with an outer gap formed therebetween, the outer stator having an outer stator core and an outer multi-phase coil wound on the outer stator core;
   an inner stator disposed radially inside the rotor with an inner gap formed therebetween, the inner stator having an inner stator core and an inner multi-phase coil wound on the inner stator core; and
   a plurality of U-shaped conductors, wherein
   each of the U-shaped conductors consists of an outer coil part that constitutes a part of the outer multi-phase coil, an inner coil part that constitutes a part of the inner multi-phase coil, and a bridging part that bridges the outer coil part and the inner coil part,
   the inner stator core has a plurality of slots formed therein,
   the inner coil parts of a predetermined number of the U-shaped conductors are received in each of the slots of the inner stator core,
   at least one of the predetermined number of the U-shaped conductors has a twisted portion formed in the bridging part on the inner stator side,
   the twisted portion is twisted by an angle within a predetermined range including 90°, and
   the twisted portion is located to overlap the inner stator core in an axial direction of the rotor.

2. The double-stator rotating electric machine as set forth in claim 1, wherein the rotor includes a rotor core and a plurality of inner permanent magnets that are provided in the rotor core so as to be closer to a radially inner surface than to a radially outer surface of the rotor core, and
   at least one of the inner permanent magnets has an exposed surface directly facing the inner stator.

3. The double-stator rotating electric machine as set forth in claim 1, further comprising a rotating shaft and a disc that connects the rotating shaft and a rotor core of the rotor, wherein
   the rotor core has a plurality of magnet-receiving holes formed in close vicinity to a radially outer surface of the rotor core,
   the rotor further includes a plurality of outer permanent magnets each of which is received in one of the magnet-receiving holes of the rotor core,
   the outer multi-phase coil has a plurality of standing portions that axially stand from an axial end face of a stator core of the outer stator with void spaces formed therebeween,
   the disc has a recess formed at a corner between a radially outer surface of the disc and an axial end surface of the disc abutting the rotor, and
   the recess communicates with the magnet-receiving holes of the rotor core and is radially aligned with the void spaces formed between the standing portions of the outer multi-phase coil.

4. The double-stator rotating electric machine as set forth in claim 1, wherein the rotor includes a rotor core and a plurality of inner permanent magnets,
   the inner permanent magnets are provided in the rotor core so as to be closer to a radially inner surface than to a radially outer surface of the rotor core and circumferentially spaced from one another, and
   the rotor core has a plurality of grooves each of which is formed in the radially inner surface of the rotor core so as to be circumferentially positioned between one adjacent pair of the inner permanent magnets.

5. The double-stator rotating electric machine as set forth in claim 1, further comprising a rotating shaft and a disc that connects the rotating shaft and a rotor core of the rotor, wherein
   the disc has at least one through-hole that is formed in the disc so as to face the inner multi-phase coil,
   the through-hole has a first part on the inner multi-phase coil side and a second part on the opposite side of the first part to the inner multi-phase coil,
   the first part is formed so as to extend in an axial direction of the disc, and
   the second part is formed so as to be closer than the first part to the rotating shaft and have an inner wall surface extending obliquely with respect to the axial direction of the disc.

6. The double-stator rotating electric machine as set forth in claim 1, further comprising a rotating shaft and a disc that connects the rotating shaft and a rotor core of the rotor, wherein
   the disc has at least one through-hole that is formed in the disc so as to face the inner multi-phase coil, and
   the entire through-hole extends obliquely with respect to an axial direction of the disc.

7. The double-stator rotating electric machine as set forth in claim 1, wherein the inner multi-phase coil has a protruding part that protrudes from the inner stator, and
   the protruding part includes a plurality of oblique portions each of which extends obliquely with respect to a direction of rotation of the rotor.

8. The double-stator rotating electric machine as set forth in claim 1, wherein the outer stator has a stator core on which the outer multi-phase coil is wound,
   the inner stator has a stator core on which the inner multi-phase coil is wound, and
   an axial thickness of the stator core of the inner stator is smaller than an axial thickness of the stator core of the outer stator.

9. The double-stator rotating electric machine as set forth in claim 1, wherein the rotor includes a rotor core, a plurality of outer permanent magnets and a plurality of inner permanent magnets,
   the outer permanent magnets are provided in the rotor core so as to be closer to a radially outer surface than to a radially inner surface of the rotor core,
   the inner permanent magnets are provided in the rotor core so as to be closer to the radially inner surface than to the radially outer surface of the rotor core, and
   an axial length of the inner permanent magnets is smaller than an axial length of the outer permanent magnets.

10. The double-stator rotating electric machine as set forth in claim 1, wherein the inner gap formed between the inner stator and the rotor is larger than the outer gap formed between the outer stator and the rotor.

11. The double-stator rotating electric machine as set forth in claim 1, wherein the double-stator rotating electric machine further includes a temperature sensing element that is arranged in a space between an adjacent pair of the bridging parts of the U-shaped conductors to sense a temperature of the U-shaped conductors.

12. A double-stator rotating electric machine comprising:
    a rotor;
    an outer stator disposed radially outside the rotor with an outer gap formed therebetween, the outer stator having an outer stator core and an outer multi-phase coil wound on the outer stator core;

an inner stator disposed radially inside the rotor with an inner gap formed therebetween, the inner stator having an inner stator core and an inner multi-phase coil wound on the inner stator core; and a plurality of U-shaped conductors, wherein each of the U-shaped conductors consists of an outer coil part that constitutes a part of the outer multi-phase coil, an inner coil part that constitutes a part of the inner multi-phase coil, and a bridging part that bridges the outer coil part and the inner coil part, the bridging part has a bent portion formed therein, the bent portion and a longitudinal axis of the bridging part being bent in a direction that is inclined in a direction of rotation of the rotor with respect to a radial direction of the rotor, and the bent portion is located to overlap neither the outer stator core nor the inner stator core in an axial direction of the rotor.

13. The double-stator rotating electric machine as set forth in claim 12, wherein the rotor includes a rotor core and a plurality of inner permanent magnets that are provided in the rotor core so as to be closer to a radially inner surface than to a radially outer surface of the rotor core, and
at least one of the inner permanent magnets has an exposed surface directly facing the inner stator.

14. The double-stator rotating electric machine as set forth in claim 12, further comprising a rotating shaft and a disc that connects the rotating shaft and a rotor core of the rotor, wherein
the rotor core has a plurality of magnet-receiving holes formed in close vicinity to a radially outer surface of the rotor core,
the rotor further includes a plurality of outer permanent magnets each of which is received in one of the magnet-receiving holes of the rotor core,
the outer multi-phase coil has a plurality of standing portions that axially stand from an axial end face of a stator core of the outer stator with void spaces formed therebeween,
the disc has a recess formed at a corner between a radially outer surface of the disc and an axial end surface of the disc abutting the rotor, and
the recess communicates with the magnet-receiving holes of the rotor core and is radially aligned with the void spaces formed between the standing portions of the outer multi-phase coil.

15. The double-stator rotating electric machine as set forth in claim 12, wherein the rotor includes a rotor core and a plurality of inner permanent magnets,
the inner permanent magnets are provided in the rotor core so as to be closer to a radially inner surface than to a radially outer surface of the rotor core and circumferentially spaced from one another, and
the rotor core has a plurality of grooves each of which is formed in the radially inner surface of the rotor core so as to be circumferentially positioned between one adjacent pair of the inner permanent magnets.

16. The double-stator rotating electric machine as set forth in claim 12, further comprising a rotating shaft and a disc that connects the rotating shaft and a rotor core of the rotor, wherein
the disc has at least one through-hole that is formed in the disc so as to face the inner multi-phase coil,
the through-hole has a first part on the inner multi-phase coil side and a second part on the opposite side of the first part to the inner multi-phase coil,
the first part is formed so as to extend in an axial direction of the disc, and
the second part is formed so as to be closer than the first part to the rotating shaft and have an inner wall surface extending obliquely with respect to the axial direction of the disc.

17. The double-stator rotating electric machine as set forth in claim 12, further comprising a rotating shaft and a disc that connects the rotating shaft and a rotor core of the rotor, wherein
the disc has at least one through-hole that is formed in the disc so as to face the inner multi-phase coil, and
the entire through-hole extends obliquely with respect to an axial direction of the disc.

18. The double-stator rotating electric machine as set forth in claim 12, wherein the inner multi-phase coil has a protruding part that protrudes from the inner stator, and
the protruding part includes a plurality of oblique portions each of which extends obliquely with respect to a direction of rotation of the rotor.

19. The double-stator rotating electric machine as set forth in claim 12, wherein the outer stator has a stator core on which the outer multi-phase coil is wound,
the inner stator has a stator core on which the inner multi-phase coil is wound, and
an axial thickness of the stator core of the inner stator is smaller than an axial thickness of the stator core of the outer stator.

20. The double-stator rotating electric machine as set forth in claim 12, wherein the rotor includes a rotor core, a plurality of outer permanent magnets and a plurality of inner permanent magnets,
the outer permanent magnets are provided in the rotor core so as to be closer to a radially outer surface than to a radially inner surface of the rotor core,
the inner permanent magnets are provided in the rotor core so as to be closer to the radially inner surface than to the radially outer surface of the rotor core, and
an axial length of the inner permanent magnets is smaller than an axial length of the outer permanent magnets.

21. The double-stator rotating electric machine as set forth in claim 12, wherein the inner gap formed between the inner stator and the rotor is larger than the outer gap formed between the outer stator and the rotor.

22. The double-stator rotating electric machine as set forth in claim 12, wherein the double-stator rotating electric machine further includes a temperature sensing element that is arranged in a space between an adjacent pair of the bridging parts of the U-shaped conductors to sense a temperature of the U-shaped conductors.

* * * * *